(12) United States Patent
Liu et al.

(10) Patent No.: US 11,259,231 B2
(45) Date of Patent: Feb. 22, 2022

(54) RELAY DETERMINING METHOD AND APPARATUS

(71) Applicant: Huawei Technologies Co., Ltd., Shenzhen (CN)

(72) Inventors: Hang Liu, Beijing (CN); Zhenzhen Cao, Beijing (CN); Xiao Xiao, Beijing (CN); Mingchao Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 255 days.

(21) Appl. No.: 16/523,437

(22) Filed: Jul. 26, 2019

(65) Prior Publication Data

US 2019/0349835 A1    Nov. 14, 2019

Related U.S. Application Data

(63) Continuation of application No. PCT/CN2017/072779, filed on Jan. 26, 2017.

(51) Int. Cl.
*H04W 40/22* (2009.01)
*H04W 40/16* (2009.01)
*H04W 88/04* (2009.01)

(52) U.S. Cl.
CPC ........... *H04W 40/22* (2013.01); *H04W 40/16* (2013.01); *H04W 88/04* (2013.01)

(58) Field of Classification Search
CPC ..... H04W 40/22; H04W 40/16; H04W 88/04; H04W 8/005; H04B 17/24
See application file for complete search history.

(56) References Cited

U.S. PATENT DOCUMENTS 9,253,753 B2    2/2016  Rubin et al.
2003/0048770 A1*  3/2003  Proctor, Jr. .......... H04B 7/0608
                                                    370/349

(Continued)

FOREIGN PATENT DOCUMENTS

CN    102448073 A    5/2012
CN    102469171 A    5/2012

(Continued)

OTHER PUBLICATIONS

"Preference for Relay Operation in LTE-A," 3GPP TSG-RAN WG1 #56, Athens, Greece, R1-091049, pp. 1-11, 3rd Generation Partnership Project, Valbonne, France (Feb. 9-13, 2009).

*Primary Examiner* — Jael M Ulysse
(74) *Attorney, Agent, or Firm* — Leydig, Voit & Mayer, Ltd.

(57) ABSTRACT

A message relay arrangement is described. A first terminal sends a first message to a second terminal, where the first message that instructs the second terminal to determine a type of the second terminal based on the first message. Based on the terminal type, the second terminal operating as the first-type terminal sends first measurement information; or operating as the second-type terminal receives first measurement information sent by a first-type terminal, determines quality of a first link between the first-type terminal and the second-type terminal, and sends the quality of the first link to the first terminal. The first terminal receives the quality of the first link sent by the second-type terminal. The first terminal determines a mapping relationship between the first-type terminal and the second-type terminal based on the quality of the first link. The first terminal sends the mapping relationship to terminals corresponding to the mapping relationship.

16 Claims, 8 Drawing Sheets

(56) References Cited

U.S. PATENT DOCUMENTS

| | | | | |
|---|---|---|---|---|
| 2010/0261469 A1* | 10/2010 | Ribeiro | ................ | H04W 99/00 455/423 |
| 2010/0323614 A1* | 12/2010 | Yu | ................ | H04W 48/18 455/9 |
| 2013/0029713 A1* | 1/2013 | Jang | ................ | H04W 4/70 455/517 |
| 2013/0322388 A1* | 12/2013 | Ahn | ................ | H04W 76/14 370/329 |
| 2014/0056220 A1* | 2/2014 | Poitau | ................ | H04L 67/16 370/328 |
| 2014/0321355 A1* | 10/2014 | Choi | ................ | H04B 7/15507 370/315 |
| 2015/0215028 A1* | 7/2015 | Ljung | ................ | H04W 40/22 370/315 |
| 2016/0150390 A1* | 5/2016 | Chen | ................ | H04W 40/246 370/311 |
| 2016/0249198 A1* | 8/2016 | Kim | ................ | H04W 72/04 |
| 2016/0286374 A1* | 9/2016 | Baghel | ................ | H04W 8/005 |
| 2016/0295494 A1* | 10/2016 | Gulati | ................ | H04W 72/085 |
| 2016/0337954 A1* | 11/2016 | Gulati | ................ | H04W 76/14 |
| 2016/0373915 A1* | 12/2016 | Kim | ................ | H04W 76/14 |
| 2016/0381666 A1* | 12/2016 | Kim | ................ | H04W 72/042 370/329 |
| 2017/0019937 A1* | 1/2017 | Kim | ................ | H04W 76/11 |
| 2017/0086114 A1* | 3/2017 | Jung | ................ | H04B 17/327 |
| 2018/0070400 A1 | 3/2018 | Wu et al. | | |
| 2018/0092017 A1* | 3/2018 | Freda | ................ | H04W 76/23 |

FOREIGN PATENT DOCUMENTS

| | | | | |
|---|---|---|---|---|
| CN | 102469410 A | 5/2012 | | |
| GB | 2491856 A | 12/2012 | | |
| WO | 2014077580 A1 | 5/2014 | | |
| WO | WO-2014077580 A1 * | 5/2014 | ............ | H04W 4/06 |
| WO | 2016179835 A1 | 11/2016 | | |

\* cited by examiner

RELAY DETERMINING METHOD AND APPARATUS

CROSS-REFERENCE TO RELATED APPLICATIONS

This application is a continuation of International Application No. PCT/CN2017/072779, filed on Jan. 26, 2017, the disclosure of which is hereby incorporated by reference in its entirety.

TECHNICAL FIELD

The present invention relates to the field of communications technologies, and specifically, to a relay determining method and apparatus.

BACKGROUND

A plurality of terminals may constitute a terminal array. In the terminal array, there is a terminal that can receive data sent by a base station and manage other terminals in the terminal array by sending information to the other terminals. The other terminals in the terminal array may report their status information to the terminal, so that the terminal can further manage the other terminals based on the status information of the other terminals. When there is a relatively large quantity of terminals in the terminal array, there may be a relatively long distance between the terminal and some of the other terminals. As a result, a path loss is relatively large, and a signal-to-noise ratio is relatively small, thereby reducing information transmission reliability.

SUMMARY

Embodiments of the present invention disclose a relay determining method and apparatus, to improve information transmission reliability.

According to a first aspect, a relay determining method is disclosed. The method is applied to a first terminal, and includes: sending a first message to a second terminal, where the first message is used to instruct the second terminal to determine a type of the second terminal based on the first message; and when the second terminal is a first-type terminal, the first-type terminal sends first measurement information; or when the second terminal is a second-type terminal, the second-type terminal receives first measurement information sent by a first-type terminal, determines quality of a first link between the first-type terminal and the second-type terminal, and sends the quality of the first link to the first terminal; receiving the quality of the first link sent by the second-type terminal; determining a mapping relationship between the first-type terminal and the second-type terminal based on the quality of the first link; and sending the mapping relationship to terminals corresponding to the mapping relationship, where the mapping relationship is used to instruct the first-type terminal corresponding to the mapping relationship to forward data to the second-type terminal corresponding to the mapping relationship, and the second terminal is any terminal except the first terminal. The first-type terminal may forward the data to the second-type terminal. Therefore, through the data forwarding, a distance at which the second-type terminal receives the data may be reduced compared to that in direct communication. This reduces a path loss and increases a signal-to-noise ratio, thereby improving information transmission reliability.

In an embodiment, the first measurement information sent by the first-type terminal may be received, quality of a second link between the first terminal and the first-type terminal is determined based on the received first measurement information, and the mapping relationship between the first-type terminal and the second-type terminal is determined based on the quality of the first link and the quality of the second link, thereby improving accuracy in determining the mapping relationship.

In an embodiment, the first message is second measurement information, the first message carries a first threshold, a second threshold, and a third threshold, the first threshold is greater than the second threshold, and the second threshold is greater than the third threshold; the first message may be used to instruct the second terminal to determine quality of a third link between the first terminal and the second terminal based on the second measurement information; and when the quality of the third link is greater than or equal to the second threshold and less than or equal to the first threshold, it is determined that the second terminal is the first-type terminal; or when the quality of the third link is less than the third threshold, it is determined that the second terminal is the second-type terminal. Therefore, the type of the second terminal may be accurately determined based on the link quality between the first terminal and the second terminal.

In an embodiment, the first message is second measurement information; a second message that includes a first threshold, a second threshold, and a third threshold may be sent to the second terminal; the first message and the second message are used to instruct the second terminal to determine quality of a third link between the first terminal and the second terminal based on the second measurement information; and when the quality of the third link is greater than or equal to the second threshold and less than or equal to the first threshold, it is determined that the second terminal is the first-type terminal; or when the quality of the third link is less than the third threshold, it is determined that the second terminal is the second-type terminal, where the first threshold is greater than the second threshold, and the second threshold is greater than the third threshold.

In an embodiment, the first message may include an identifier and the type of the second terminal; and the first message may be used to instruct the second terminal to determine the type of the second terminal based on the identifier of the second terminal, thereby improving a rate in determining the type of the second terminal.

In an embodiment, the first message may further include an identifier of a first-type terminal corresponding to each link whose quality needs to be measured by the second-type terminal. This can reduce a quantity of links whose quality needs to be measured by the second-type terminal, thereby improving relay determining efficiency.

According to a second aspect, a relay determining apparatus is disclosed, where the apparatus includes units for performing the relay determining method according to any one of the first aspect or the possible implementations of the first aspect.

According to a third aspect, a relay determining apparatus is disclosed, where the relay determining apparatus is applied to a first terminal, and includes a processor, a memory, and a transceiver, where the transceiver is configured to send a first message to a second terminal, where the first message is used to instruct the second terminal to determine a type of the second terminal based on the first message; and when the second terminal is a first-type terminal, the first-type terminal sends first measurement information; or when the second terminal is a second-type terminal, the second-type terminal receives first measurement information sent by a first-type terminal, determines quality of a first link between the first-type terminal and the second-type terminal, and sends the quality of the first link to the first terminal, where the second terminal is any terminal except the first terminal;

the transceiver is further configured to receive the quality of the first link sent by the second-type terminal;

the memory stores a group of program code, and the processor is configured to call the program code stored in the memory to perform the following operation:

determining a mapping relationship between the first-type terminal and the second-type terminal based on the quality of the first link; and the transceiver is further configured to send the mapping relationship to terminals corresponding to the mapping relationship, where the mapping relationship is used to instruct the first-type terminal corresponding to the mapping relationship to forward data to the second-type terminal corresponding to the mapping relationship.

According to a fourth aspect, a readable storage medium is disclosed, where the readable storage medium stores program code used by a relay determining apparatus to perform the relay determining method according to any one of the first aspect or the possible implementations of the first aspect.

According to a fifth aspect, a relay determining method is disclosed, where the method is applied to a second terminal, and includes: receiving a first message sent by a first terminal; determining a type of the second terminal based on the first message; when the second terminal is a first-type terminal, sending first measurement information; or when the second terminal is a second-type terminal, receiving first measurement information sent by a first-type terminal, determining quality of a first link between the first-type terminal and the second-type terminal based on the received first measurement information, and sending the quality of the first link to the first terminal, where the quality of the first link is used to instruct the first terminal to determine a mapping relationship between the first-type terminal and the second-type terminal based on the quality of the first link and send the mapping relationship to terminals corresponding to the mapping relationship; and receiving the mapping relationship, where the mapping relationship is used to: when the second terminal is the first-type terminal, instruct the second terminal to forward data to the second-type terminal corresponding to the mapping relationship. The first-type terminal may forward the data to the second-type terminal. Therefore, through the data forwarding, a distance at which the second-type terminal receives the data may be reduced compared to that in direct communication. This reduces a path loss and increases a signal-to-noise ratio, thereby improving information transmission reliability.

In an embodiment, the first measurement information may be used to instruct the first terminal to determine quality of a second link between the first terminal and the first-type terminal based on the received first measurement information; and the quality of the first link may be used to instruct the first terminal to determine the mapping relationship between the first-type terminal and the second-type terminal based on the quality of the first link and the quality of the second link, thereby improving accuracy in determining the mapping relationship.

In an embodiment, the first message is second measurement information, the first message carries a first threshold, a second threshold, and a third threshold, the first threshold is greater than the second threshold, and the second threshold is greater than the third threshold; quality of a third link between the first terminal and the second terminal may be determined based on the second measurement information; and when the link quality of the third link is greater than or equal to the second threshold and less than or equal to the first threshold, it is determined that the second terminal is the first-type terminal; or when the quality of the third link is less than the third threshold, it is determined that the second terminal is the second-type terminal. Therefore, the type of the second terminal may be accurately determined based on the link quality between the first terminal and the second terminal.

In an embodiment, the first message is second measurement information, a second message that includes a first threshold, a second threshold, and a third threshold and that is sent by the first terminal is received, where the first threshold is greater than the second threshold, and the second threshold is greater than the third threshold; quality of a third link between the first terminal and the second terminal may be determined based on the second measurement information; and when the quality of the third link is greater than or equal to the second threshold and less than or equal to the first threshold, it is determined that the second terminal is the first-type terminal; or when the quality of the third link is less than the third threshold, it is determined that the second terminal is the second-type terminal. Therefore, the type of the second terminal may be accurately determined based on the link quality between the first terminal and the second terminal.

In an embodiment, the first message includes an identifier and the type of the second terminal, the identifier of the second terminal may be obtained, and the type of the second terminal is determined based on the obtained identifier, thereby improving a rate in determining the type of the terminal.

In an embodiment, the first message further includes an identifier of a first-type terminal corresponding to each link whose quality needs to be measured by the second-type terminal. First measurement information sent by an expected terminal is received, and quality of a first link between the second-type terminal and the expected terminal is determined based on the first measurement information, where the expected terminal is any terminal of the first-type terminals corresponding to the links whose quality needs to be measured by the second-type terminal. This can reduce a quantity of links whose quality needs to be measured by the second-type terminal, thereby improving relay determining efficiency.

According to a sixth aspect, a relay determining apparatus is disclosed, where the apparatus includes units for performing the relay determining method according to any one of the fifth aspect or the possible implementations of the fifth aspect.

According to a seventh aspect, a relay determining apparatus is disclosed, where the apparatus is applied to a second terminal, and includes a processor, a memory, and a transceiver, where the transceiver is configured to receive a first message sent by a first terminal;

the memory stores a group of program code, and the processor is configured to call the program code stored in the memory to perform the following operation:

determining a type of the second terminal based on the first message;

the transceiver is further configured to: when the second terminal is a first-type terminal, send first measurement information; or the transceiver is further configured to: when the second terminal is a second-type terminal, receive first measurement information sent by a first-type terminal, determine quality of a first link between the first-type terminal and the second-type terminal based on the received first measurement information, and send the quality of the first link to the first terminal, where the quality of the first link is used to instruct the first terminal to determine a mapping relationship between the first-type terminal and the second-type terminal based on the quality of the first link and send the mapping relationship to terminals corresponding to the mapping relationship; and the transceiver is further configured to receive the mapping relationship, where the mapping relationship is used to: when the second terminal is the first-type terminal, instruct the second terminal to forward data to the second-type terminal corresponding to the mapping relationship.

According to an eighth aspect, a readable storage medium is disclosed, where the readable storage medium stores program code used by a relay determining apparatus to perform the relay determining method according to any one of the fifth aspect or the possible implementations of the fifth aspect.

DESCRIPTION OF EMBODIMENTS

Embodiments of the present invention disclose a relay determining method and apparatus, to improve information transmission reliability. Detailed descriptions are provided below.

Figure 1:
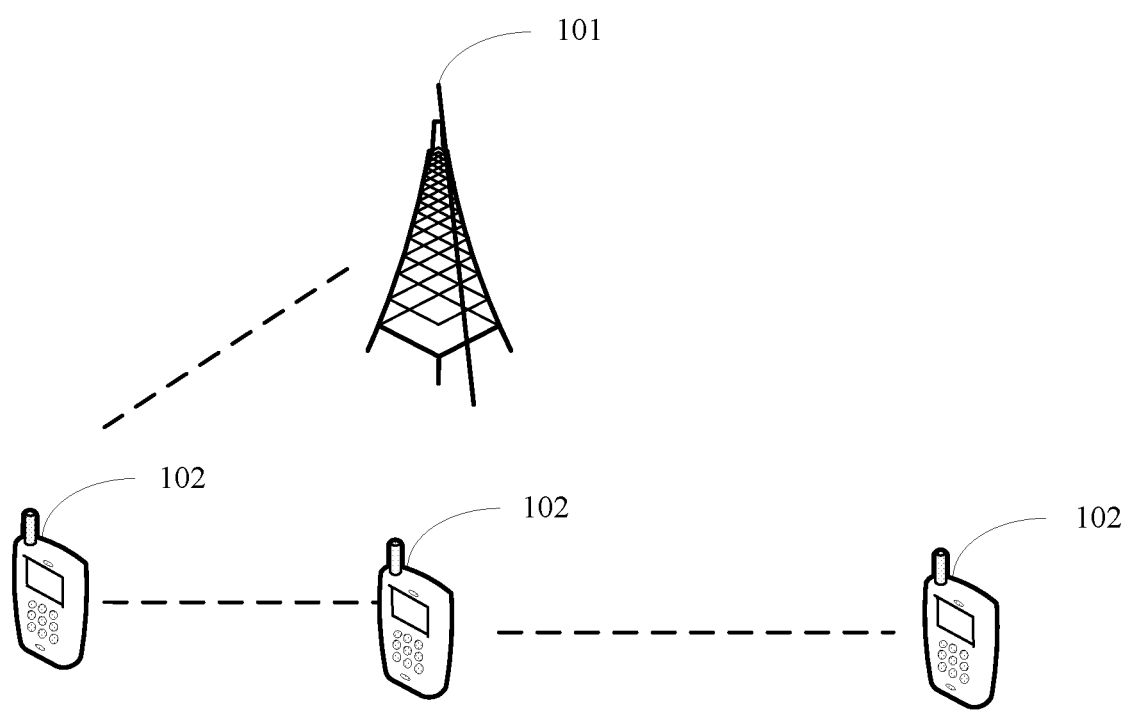
FIG. 1 is a schematic diagram of a network architecture disclosed in an embodiment of the present invention.

To facilitate better understanding of the relay determining method and apparatus disclosed in the embodiments of the present invention, the following first describes a network architecture used in the embodiments of the present invention. FIG. 1 is a schematic diagram of a network architecture disclosed in an embodiment of the present invention. As shown in FIG. 1, the network architecture may include a base station 101 and at least three terminals 102. The at least three terminals 102 may constitute a terminal array. In the terminal array, there is a terminal that can receive data sent by the base station 101 and manage other terminals in the terminal array by sending information to the other terminals. The terminal may be referred to as a first terminal, and each terminal other than the first terminal in the terminal array may be referred to as a second terminal. The second terminal may report status information of the second terminal to the first terminal, so that the first terminal can further manage the second terminal based on the status information of the second terminal. Generally, in an array constituted of a plurality of terminals, a terminal ranked first may be a first terminal, and each terminal other than the first terminal may be a second terminal. The first terminal may be located at any location in the terminal array. The base station 101 is configured to communicate with the first terminal. Terminals except the first terminal in the terminal array may be divided into three types of terminals. A distance between a first-type terminal and the first terminal is relatively short. The first-type terminal may forward, to a second-type terminal, received data sent by the first terminal. A distance between the second-type terminal and the first terminal is relatively long. If the second-type terminal directly receives data sent by the first terminal, data reliability is reduced because a transmission distance is relatively long. Therefore, the second-type terminal does not directly receive the data sent by the first terminal, but receives the data forwarded by the first-type terminal. A distance between a third-type terminal and the first terminal falls between the distance between the first-type terminal and the first terminal and the distance between the second-type terminal and the first terminal. The third-type terminal may directly receive data from the first terminal with no need to forward data to the second-type terminal. The terminals 102 may be mobile devices, for example, vehicles, airplanes, ships, tanks, or farming equipment; may be smart devices, for example, mobile phones, tablet computers, sensor devices, or wearable devices; or may be infrastructures, for example, handrails, road lamps, and buildings.

When the terminals 102 are vehicles, at least three vehicles keep away from each other at a relatively short distance and constitute a vehicle array. In a driving process of the vehicle array, all the vehicles except a first vehicle (that is, the first terminal) may use unmanned driving or man-assisted driving. This can effectively reduce human resource costs. To prevent collision between different vehicle nodes and ensure traffic safety, the vehicles need to share information such as locations, orientations, statuses, acceleration, and deceleration with each other. The first vehicle may send a control instruction to a second vehicle (that is, the second terminal, namely any vehicle except the first vehicle in the vehicle array) to control a speed, a direction, or the like of the second vehicle, thereby controlling a driving status of the vehicle array and ensuring that the vehicle array can drive in a closely arrayed manner. The second vehicle also needs to report status information of the second vehicle to the first vehicle, so that the first vehicle further controls the driving status of the vehicle array based on the status information.

Figure 2:
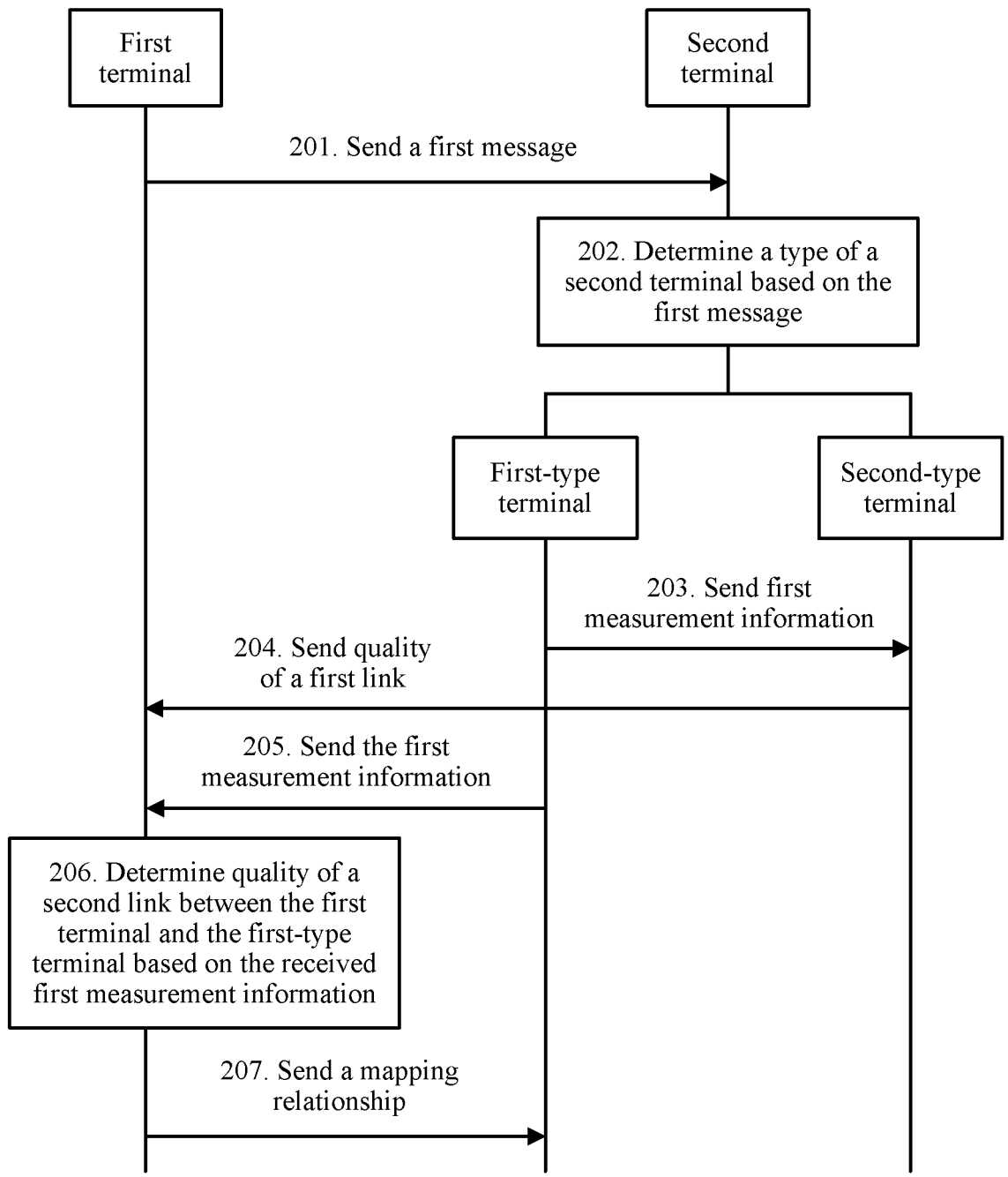
FIG. 2 is a schematic flowchart of a relay determining method disclosed in an embodiment of the present invention.

Based on the network architecture shown in FIG. 1, FIG. 2 is a schematic flowchart of a relay determining method disclosed in an embodiment of the present invention. The relay determining method is described from a perspective of the at least three terminals 102. As shown in FIG. 2, the relay determining method may include the following steps.

201. A first terminal sends a first message to a second terminal.

In this embodiment, when there is a relatively large quantity of terminals in a terminal array, there is a relatively long distance between the first terminal and some second terminals. If the first terminal directly exchanges data with these second terminals, reliability of data received by these second terminals is reduced, or reliability of data sent by these second terminals and received by the first terminal is reduced. Therefore, the first terminal may send the first message to the second terminal. The first terminal may send the first message periodically, or may send the first message only once. The second terminal is any terminal except the first terminal in the terminal array.

202. The second terminal determines a type of the second terminal based on the first message.

In this embodiment, after receiving the first message sent by the first terminal, the second terminal determines the type of the second terminal based on the first message. The first message may be second measurement information, for example, a discovery message or a data packet of a demodulation reference signal (DMRS). The first message carries a first threshold, a second threshold, and a third threshold, where the first threshold is greater than the second threshold, and the second threshold is greater than the third threshold. After receiving the first message, the second terminal may determine quality of a third link between the first terminal and the second terminal based on the second measurement information. When the link quality of the third link is greater than or equal to the second threshold and less than or equal to the first threshold, it indicates that a distance between the first terminal and the second terminal is relatively short, and it may be determined that the second terminal is a first-type terminal; when the quality of the third link is less than the third threshold, it indicates that a distance between the first terminal and the second terminal is relatively long, and it may be determined that the second terminal is a second-type terminal; or when the quality of the third link is greater than or equal to the third threshold and less than the second threshold, it indicates that a distance between the first terminal and the second terminal is neither long nor short, and it may be determined that the second terminal is a third-type terminal. The link quality may be reference signal received power (RSRP), reference signal received quality (RSRQ), or the like.

In this embodiment, the first message may be second measurement information. The first terminal may further send the second terminal a second message that includes a first threshold, a second threshold, and a third threshold, where the first threshold is greater than the second threshold, and the second threshold is greater than the third threshold. After receiving the first message and the second message that are sent by the first terminal, the second terminal may determine quality of a third link between the first terminal and the second terminal based on the second measurement information. When the quality of the third link is greater than or equal to the second threshold and less than or equal to the first threshold, it may be determined that the second terminal is a first-type terminal; when the quality of the third link is less than the third threshold, it may be determined that the second terminal is a second-type terminal; or when the quality of the third link is greater than or equal to the third threshold and less than the second threshold, it may be determined that the second terminal is a third-type terminal. The third-type terminal is configured to receive data sent by the first terminal, and send status information of the third-type terminal to the first terminal.

In this embodiment, the first message may include an identifier and the type of the second terminal. After receiving the first message sent by the first terminal, the second terminal obtains the identifier of the second terminal, and determines the type of the second terminal based on the obtained identifier. For example, the identifier and the type of the second terminal that are included in the first message may be shown in Table 1 below:

TABLE 1

| Terminal identifier | Terminal type |
|---|---|
| Identifier 1 | First-type terminal |
| Identifier 2 | Second-type terminal |
| . . . | . . . |

Alternatively, the identifier and the type of the second terminal that are included in the first message may be shown in Table 2 below:

TABLE 2

| First-type terminal | Identifier 1, identifier 2, . . . |
|---|---|
| Second-type terminal | Identifier 3, identifier 4, . . . |

If the first message is sent only to a particular second terminal, the first message may include only a type of this second terminal, and may not include an identifier and a type of another second terminal. A relationship between the identifier and the type of the second terminal may be implicit. For example, types of second terminals are distinguished by carrying names of different information elements.

203. A first-type terminal sends first measurement information to a second-type terminal.

In this embodiment, after the second terminal determines the type of the second terminal based on the first message, when the second terminal is the first-type terminal, the first-type terminal sends the first measurement information to the second-type terminal. The first-type terminal may send the first measurement information periodically, or may send the first measurement information only once. The first measurement information may be a discovery message, a data packet of a DMRS, or the like. The first measurement information and the second measurement information may be the same or may be different. The first measurement information sent by the first-type terminal may be sent in a broadcast manner or may be sent in another manner. This embodiment sets no limitation thereto.

204. The second-type terminal determines quality of a first link between the first-type terminal and the second-type terminal based on the received first measurement information, and sends the quality of the first link to the first terminal.

In this embodiment, after receiving the first measurement information sent by the first-type terminal, the second-type terminal determines the quality of the first link between the first-type terminal and the second-type terminal based on the received first measurement information, and sends the quality of the first link to the first terminal. The first message may further include an identifier of a first-type terminal corresponding to each link whose quality needs to be measured by the second-type terminal. The second-type terminal may receive first measurement information sent by an expected terminal, and determine quality of a first link between the second-type terminal and the expected terminal based on the first measurement information, where the expected terminal is any terminal of the first-type terminals corresponding to the links whose quality needs to be measured by the second-type terminal. When the second-type terminal sends the determined quality of the first link to the first terminal, the quality of the first link may be sent directly to the first terminal, or may be forwarded to the first terminal by using a terminal that has established a relay to the first terminal.

205. The first-type terminal sends the first measurement information to the first terminal.

In this embodiment, after the second terminal determines the type of the second terminal based on the first message, when the second terminal is the first-type terminal, the first-type terminal may also send the first measurement information to the first terminal. Step 205 may be performed, or may be not performed. The first measurement information sent by the first-type terminal may be sent in a broadcast manner or may be sent in another manner. This embodiment sets no limitation thereto. Step 205 and step 203 may be a same step, or may be two steps.

206. The first terminal determines quality of a second link between the first terminal and the first-type terminal based on the received first measurement information.

In this embodiment, after receiving the first measurement information sent by the first-type terminal, the first terminal determines the quality of the second link between the first terminal and the first-type terminal based on the received first measurement information.

207. The first terminal determines a mapping relationship between the first-type terminal and the second-type terminal based on the quality of the first link, and sends the mapping relationship to terminals corresponding to the mapping relationship.

In this embodiment, the mapping relationship between the first-type terminal and the second-type terminal may be shown in Table 3:

TABLE 3

| First-type terminal | Second-type terminal |
|---|---|
| Identifier 1 | Identifier 2 and identifier 3 |
| Identifier 4 | Identifier 5 |
| . . . | . . . |

Alternatively, the mapping relationship between the first-type terminal and the second-type terminal may be shown in Table 4:

TABLE 4

| Second-type terminal | First-type terminal |
|---|---|
| Identifier 1 | Identifier 2 and identifier 3 |
| Identifier 4 | Identifier 5 |
| . . . | . . . |

Each first-type terminal may correspond to one or more second-type terminals. This indicates that one first-type terminal may provide a relay service for one or more second-type terminals. Each second-type terminal may also correspond to one or more first-type terminals. This indicates that for each second-type terminal, one or more first-type terminals may be used to forward data to the second-type terminal. If the mapping relationship is sent only to a particular first-type terminal, the mapping relationship may include only an identifier of a second-type terminal corresponding to the mapping relationship, and may not include an identifier of the first-type terminal. If the mapping relationship is sent only to a particular second-type terminal, the mapping relationship may include only an identifier of a first-type terminal corresponding to the mapping relationship, and may not include an identifier of the second-type terminal.

In this embodiment, after receiving the quality of the first link sent by the second-type terminal, the first terminal may determine the mapping relationship between the first-type terminal and the second-type terminal based on the quality of the first link, and send the mapping relationship to the terminals corresponding to the mapping relationship. The mapping relationship may be sent by the first terminal in a broadcast manner, or may be sent in another manner. This embodiment sets no limitation thereto.

In this embodiment, when receiving the first measurement information sent by the first-type terminal, the first terminal may determine the mapping relationship between the first-type terminal and the second-type terminal based on the quality of the first link and the quality of the second link.

In this embodiment, after receiving the corresponding mapping relationship, the first-type terminal may forward, to the corresponding second-type terminal, data sent by the first terminal to the second-type terminal corresponding to the mapping relationship, and may also forward, to the first terminal, data sent to the first terminal by the second-type terminal corresponding to the mapping relationship. After receiving the corresponding mapping relationship, the second-type terminal may receive, from the first-type terminal corresponding to the mapping relationship, the data sent to the second-type terminal by the first terminal, and may also send, to the first-type terminal corresponding to the mapping relationship, the data sent to the first terminal.

In the relay determining method described in FIG. 2, the first terminal sends the first message to the second terminal, and the second terminal determines the type of the second terminal based on the first message. When the second terminal is the first-type terminal, the first-type terminal sends the first measurement information to the second-type terminal; or when the second terminal is the second-type terminal, the second-type terminal determines the quality of the first link between the first-type terminal and the second-type terminal based on the received first measurement information sent by the first-type terminal, and sends the quality of the first link to the first terminal. The first terminal determines the mapping relationship between the first-type terminal and the second-type terminal based on the quality of the first link, and sends the mapping relationship to the terminals corresponding to the mapping relationship, where the mapping relationship may be used to instruct the first-type terminal corresponding to the mapping relationship to forward data to the second-type terminal corresponding to the mapping relationship. The first-type terminal may forward the data to the second-type terminal. Therefore, through the data forwarding, a distance at which the second-type terminal receives the data may be reduced compared to that in direct communication. This reduces a path loss and increases a signal-to-noise ratio, thereby improving information transmission reliability.

Figure 3:
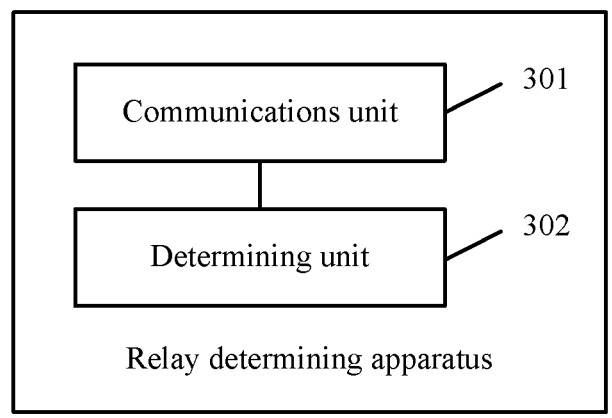
FIG. 3 is a schematic structural diagram of a relay determining apparatus disclosed in an embodiment of the present invention.

Based on the network architecture shown in FIG. 1, FIG. 3 is a schematic structural diagram of a relay determining apparatus disclosed in an embodiment of the present invention. The relay determining apparatus is applied to a first terminal. As shown in FIG. 3, the apparatus may include:

a communications unit 301, configured to send a first message to a second terminal, where the first message is used to instruct the second terminal to determine a type of the second terminal based on the first message; and when the second terminal is a first-type terminal, the first-type terminal sends first measurement information; or when the second terminal is a second-type terminal, the second-type terminal receives first measurement information sent by a first-type terminal, determines quality of a first link between the first-type terminal and the second-type terminal, and sends the quality of the first link to the first terminal, where the second terminal is any terminal except the first terminal, and the communications unit 301 is further configured to receive the quality of the first link sent by the second-type terminal; and a determining unit 302, configured to determine a mapping relationship between the first-type terminal and the second-type terminal based on the quality of the first link received by the communications unit 301, where the communications unit 301 is further configured to send the mapping relationship to terminals corresponding to the mapping relationship, where the mapping relationship is used to instruct the first-type terminal corresponding to the mapping relationship to forward data to the second-type terminal corresponding to the mapping relationship.

In a possible implementation, the communications unit 301 is further configured to receive the first measurement information sent by the first-type terminal;

the determining unit 302 is further configured to determine quality of a second link between the first terminal and the first-type terminal based on the received first measurement information; and that the determining unit 302 determines a mapping relationship between the first-type terminal and the second-type terminal based on the quality of the first link includes:

determining the mapping relationship between the first-type terminal and the second-type terminal based on the quality of the first link and the quality of the second link.

In a possible implementation, the first message is second measurement information, the first message carries a first threshold, a second threshold, and a third threshold, the first threshold is greater than the second threshold, and the second threshold is greater than the third threshold; and that the first message is used to instruct the second terminal to determine a type of the second terminal based on the first message includes:

the first message is used to instruct the second terminal to determine quality of a third link between the first terminal and the second terminal based on the second measurement information; and when the quality of the third link is greater than or equal to the second threshold and less than or equal to the first threshold, it is determined that the second terminal is the first-type terminal; or when the quality of the third link is less than the third threshold, it is determined that the second terminal is the second-type terminal.

In a possible implementation, the first message is second measurement information;

the communications unit 301 is further configured to send a second message to the second terminal, where the second message includes a first threshold, a second threshold, and a third threshold, the first threshold is greater than the second threshold, and the second threshold is greater than the third threshold; and that the first message is used to instruct the second terminal to determine a type of the second terminal based on the first message includes:

the first message and the second message are used to instruct the second terminal to determine quality of a third link between the first terminal and the second terminal based on the second measurement information; and when the quality of the third link is greater than or equal to the second threshold and less than or equal to the first threshold, it is determined that the second terminal is the first-type terminal; or when the quality of the third link is less than the third threshold, it is determined that the second terminal is the second-type terminal.

In a possible implementation, the first message may include an identifier and the type of the second terminal; and that the first message is used to instruct the second terminal to determine a type of the second terminal based on the first message includes:

the first message is used to instruct the second terminal to determine the type of the second terminal based on the identifier of the second terminal.

In a possible implementation, the first message may further include an identifier of a first-type terminal corresponding to each link whose quality needs to be measured by the second-type terminal.

The relay determining apparatus described in FIG. 3 sends the first message to the second terminal, where the first message is used to instruct the second terminal to determine the type of the second terminal based on the first message. When the second terminal is the first-type terminal, the first-type terminal sends the first measurement information; or when the second terminal is the second-type terminal, the second-type terminal receives the first measurement information sent by the first-type terminal, determines the quality of the first link between the first-type terminal and the second-type terminal, and sends the quality of the first link to the first terminal. The relay determining apparatus receives the quality of the first link sent by the second-type terminal, determines the mapping relationship between the first-type terminal and the second-type terminal based on the quality of the first link, and sends the mapping relationship to the terminals corresponding to the mapping relationship, where the mapping relationship is used to instruct the first-type terminal corresponding to the mapping relationship to forward data to the second-type terminal corresponding to the mapping relationship. The first-type terminal may forward the data to the second-type terminal. Therefore, a distance at which the second-type terminal receives the data may be reduced compared to that in a direct communication link. This reduces a path loss and increases a signal-to-noise ratio, thereby improving information transmission reliability.

Figure 4:
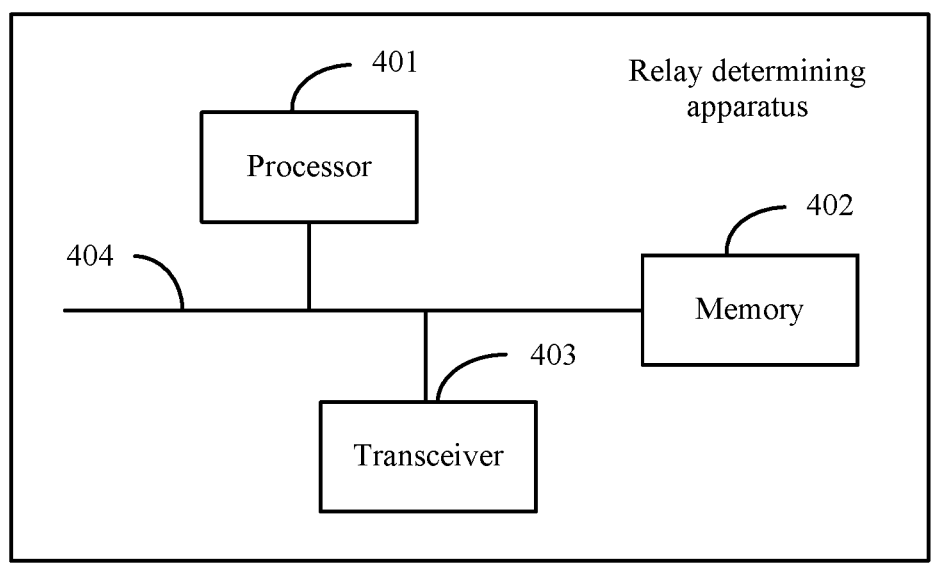
FIG. 4 is a schematic structural diagram of another relay determining apparatus disclosed in an embodiment of the present invention.

Based on the network architecture shown in FIG. 1, FIG. 4 is a schematic structural diagram of another relay determining apparatus disclosed in an embodiment of the present invention. The relay determining apparatus is applied to a first terminal. As shown in FIG. 4, the relay determining apparatus may include a processor 401, a memory 402, a transceiver 403, and a bus 404. The processor 401 may be a general-purpose central processing unit (CPU), a plurality of CPUs, a microprocessor, an application-specific integrated circuit (ASIC), or one or more integrated circuits that are configured to control program execution of solutions of the present invention. The memory 402 may be a read-only memory (ROM) or another type of static storage device that can store static information and instructions, or a random access memory (RAM) or another type of dynamic storage device that can store information and instructions; or may be an electrically erasable programmable read-only memory (EEPROM), a compact disc read-only memory (CD-ROM) or other optic disk storage, optical disc storage (including a compact optical disc, a laser disc, an optical disc, a digital general-purpose optical disc, a Blu-ray optical disc, or the like), or magnetic disk storage media or other magnetic storage devices, or any other media that can be accessed by a computer and that can be configured to carry or store expected program code having an instruction or data structure form, without being limited thereto. The memory 402 may exist alone, and the bus 404 is connected to the processor 401. Alternatively, the memory 402 may be integrated with the processor 401. The bus 404 may include a channel for transferring information between the foregoing components.

The transceiver 403 is configured to send a first message to a second terminal, where the first message is used to instruct the second terminal to determine a type of the second terminal based on the first message; and when the second terminal is a first-type terminal, the first-type terminal sends first measurement information; or when the second terminal is a second-type terminal, the second-type terminal receives first measurement information sent by a first-type terminal, determines quality of a first link between the first-type terminal and the second-type terminal, and sends the quality of the first link to the first terminal, where the second terminal is any terminal except the first terminal;

the transceiver 403 is further configured to receive the quality of the first link sent by the second-type terminal and sends the quality of the first link to the processor 401;

the memory 402 stores a group of program code, and the processor 401 is configured to call the program code stored in the memory 402 to perform the following operation:

determining a mapping relationship between the first-type terminal and the second-type terminal based on the quality of the first link; and the transceiver 403 is further configured to send the mapping relationship to terminals corresponding to the mapping relationship, where the mapping relationship is used to instruct the first-type terminal corresponding to the mapping relationship to forward data to the second-type terminal corresponding to the mapping relationship.

In a possible implementation, the transceiver 403 is further configured to receive the first measurement information sent by the first-type terminal;

the processor 401 is further configured to call the program code stored in the memory 402 to perform the following operation:

determining quality of a second link between the first terminal and the first-type terminal based on the received first measurement information; and that the processor 401 determines a mapping relationship between the first-type terminal and the second-type terminal based on the quality of the first link includes:

determining the mapping relationship between the first-type terminal and the second-type terminal based on the quality of the first link and the quality of the second link.

In a possible implementation, the first message is second measurement information, the first message carries a first threshold, a second threshold, and a third threshold, the first threshold is greater than the second threshold, and the second threshold is greater than the third threshold; and that the first message is used to instruct the second terminal to determine a type of the second terminal based on the first message includes:

the first message is used to instruct the second terminal to determine quality of a third link between the first terminal and the second terminal based on the second measurement information; and when the quality of the third link is greater than or equal to the second threshold and less than or equal to the first threshold, it is determined that the second terminal is the first-type terminal; or when the quality of the third link is less than the third threshold, it is determined that the second terminal is the second-type terminal.

In a possible implementation, the first message is second measurement information;

the transceiver 403 is further configured to send a second message to the second terminal, where the second message includes a first threshold, a second threshold, and a third threshold, the first threshold is greater than the second threshold, and the second threshold is greater than the third threshold; and that the first message is used to instruct the second terminal to determine a type of the second terminal based on the first message includes:

the first message and the second message are used to instruct the second terminal to determine quality of a third link between the first terminal and the second terminal based on the second measurement information; and when the quality of the third link is greater than or equal to the second threshold and less than or equal to the first threshold, it is determined that the second terminal is the first-type terminal; or when the quality of the third link is less than the third threshold, it is determined that the second terminal is the second-type terminal.

In a possible implementation, the first message includes an identifier and the type of the second terminal; and that the first message is used to instruct the second terminal to determine a type of the second terminal based on the first message includes:

the first message is used to instruct the second terminal to determine the type of the second terminal based on the identifier of the second terminal.

In a possible implementation, the first message further includes an identifier of a first-type terminal corresponding to each link whose quality needs to be measured by the second-type terminal.

The relay determining apparatus described in FIG. 4 sends the first message to the second terminal, where the first message is used to instruct the second terminal to determine the type of the second terminal based on the first message. When the second terminal is the first-type terminal, the first-type terminal sends the first measurement information; or when the second terminal is the second-type terminal, the second-type terminal receives the first measurement information sent by the first-type terminal, determines the quality of the first link between the first-type terminal and the second-type terminal, and sends the quality of the first link to the first terminal. The relay determining apparatus receives the quality of the first link sent by the second-type terminal, determines the mapping relationship between the first-type terminal and the second-type terminal based on the quality of the first link, and sends the mapping relationship to the terminals corresponding to the mapping relationship, where the mapping relationship is used to instruct the first-type terminal corresponding to the mapping relationship to forward data to the second-type terminal corresponding to the mapping relationship. The first-type terminal may forward the data to the second-type terminal. Therefore, a distance at which the second-type terminal receives the data may be reduced compared to that in a direct communication link. This reduces a path loss and increases a signal-to-noise ratio, thereby improving information transmission reliability.

Figure 5:
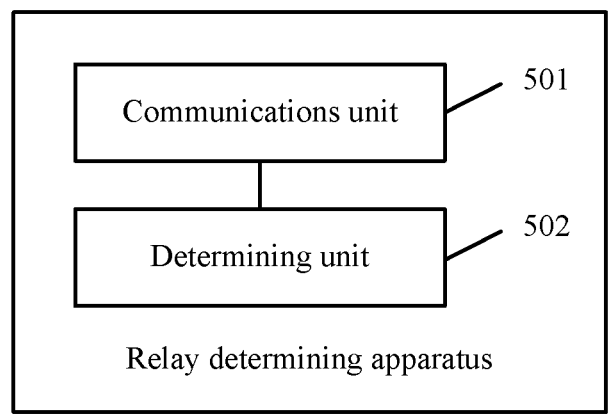
FIG. 5 is a schematic structural diagram of still another relay determining apparatus disclosed in an embodiment of the present invention.

Based on the network architecture shown in FIG. 1, FIG. 5 is a schematic structural diagram of still another relay determining apparatus disclosed in an embodiment of the present invention. The relay determining apparatus is applied to a second terminal. As shown in FIG. 5, the relay determining apparatus may include:

a communications unit 501, configured to receive a first message sent by a first terminal; and a determining unit 502, configured to determine a type of the second terminal based on the first message received by the communications unit 501, where the communications unit 501 is further configured to: when the second terminal is a first-type terminal, send first measurement information; or the communications unit 501 is further configured to: when the second terminal is a second-type terminal, receive first measurement information sent by a first-type terminal, determine quality of a first link between the first-type terminal and the second-type terminal based on the received first measurement information, and send the quality of the first link to the first terminal, where the quality of the first link is used to instruct the first terminal to determine a mapping relationship between the first-type terminal and the second-type terminal based on the quality of the first link and send the mapping relationship to terminals corresponding to the mapping relationship; and the communications unit 501 is further configured to receive the mapping relationship, where the mapping relationship is used to: when the second terminal is the first-type terminal, instruct the second terminal to forward data to the second-type terminal corresponding to the mapping relationship.

In a possible implementation, the first measurement information is used to instruct the first terminal to determine quality of a second link between the first terminal and the first-type terminal based on the received first measurement information; and that the quality of the first link is used to instruct the first terminal to determine a mapping relationship between the first-type terminal and the second-type terminal based on the quality of the first link includes:

the quality of the first link is used to instruct the first terminal to determine the mapping relationship between the first-type terminal and the second-type terminal based on the quality of the first link and the quality of the second link.

In a possible implementation, the first message is second measurement information, the first message carries a first threshold, a second threshold, and a third threshold, the first threshold is greater than the second threshold, and the second threshold is greater than the third threshold; and the determining unit 502 is specifically configured to determine quality of a third link between the first terminal and the second terminal based on the second measurement information; and when the link quality of the third link is greater than or equal to the second threshold and less than or equal to the first threshold, determine that the second terminal is the first-type terminal; or when the quality of the third link is less than the third threshold, determine that the second terminal is the second-type terminal.

In a possible implementation, the first message is second measurement information;

the communications unit 501 is further configured to receive a second message sent by the first terminal, where the second message includes a first threshold, a second threshold, and a third threshold, the first threshold is greater than the second threshold, and the second threshold is greater than the third threshold; and the determining unit 502 is specifically configured to determine quality of a third link between the first terminal and the second terminal based on the second measurement information; and when the quality of the third link is greater than or equal to the second threshold and less than or equal to the first threshold, determine that the second terminal is the first-type terminal; or when the quality of the third link is less than the third threshold, determine that the second terminal is the second-type terminal.

In a possible implementation, the first message includes an identifier and the type of the second terminal; and the determining unit 502 is specifically configured to obtain the identifier of the second terminal, and determine the type of the second terminal based on the obtained identifier.

In a possible implementation, the first message further includes an identifier of a first-type terminal corresponding to each link whose quality needs to be measured by the second-type terminal; and that the communications unit 501 receives first measurement information sent by a first-type terminal, and determines quality of a first link between the first-type terminal and the second-type terminal based on the received first measurement information includes:

receiving first measurement information sent by an expected terminal, and determining quality of a first link between the second terminal and the expected terminal based on the first measurement information, where the expected terminal is any terminal of the first-type terminals corresponding to the links whose quality needs to be measured by the second-type terminal.

The relay determining apparatus described in FIG. 5 receives the first message sent by the first terminal; determines the type of the second terminal based on the first message; when the second terminal is the first-type terminal, sends the first measurement information; or when the second terminal is the second-type terminal, receives the first measurement information sent by the first-type terminal, determines the quality of the first link between the first-type terminal and the second-type terminal based on the received first measurement information, and sends the quality of the first link to the first terminal, where the quality of the first link is used to instruct the first terminal to determine the mapping relationship between the first-type terminal and the second-type terminal based on the quality of the first link and send the mapping relationship to the terminals corresponding to the mapping relationship; and receives the mapping relationship, where the mapping relationship is used to: when the second terminal is the first-type terminal, instruct the second terminal to forward data to the second-type terminal corresponding to the mapping relationship. The first-type terminal may forward the data to the second-type terminal. Therefore, a distance at which the second-type terminal receives the data may be reduced. This reduces a path loss and increases a signal-to-noise ratio, thereby improving information transmission reliability.

Figure 6:
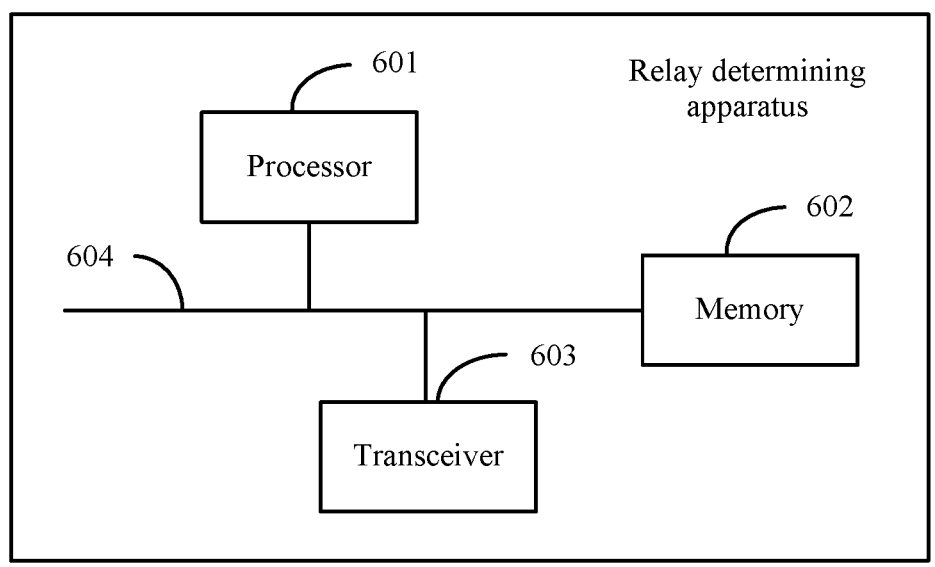
FIG. 6 is a schematic structural diagram of yet another relay determining apparatus disclosed in an embodiment of the present invention.

Based on the network architecture shown in FIG. 1, FIG. 6 is a schematic structural diagram of yet another relay determining apparatus disclosed in an embodiment of the present invention. The relay determining apparatus is applied to a second terminal. As shown in FIG. 6, the relay determining apparatus may include a processor 601, a memory 602, a transceiver 603, and a bus 604. The processor 601 may be a general-purpose central processing unit (CPU), a plurality of CPUs, a microprocessor, an application-specific integrated circuit (ASIC), or one or more integrated circuits that are configured to control program execution of solutions of the present invention. The memory 602 may be a read-only memory (ROM) or another type of static storage device that can store static information and instructions, or a random access memory (RAM) or another type of dynamic storage device that can store information and instructions; or may be an electrically erasable programmable read-only memory (EEPROM), a compact disc read-only memory (CD-ROM) or other optic disk storage, optical disc storage (including a compact optical disc, a laser disc, an optical disc, a digital general-purpose optical disc, a Blu-ray optical disc, or the like), or magnetic disk storage media or other magnetic storage devices, or any other media that can be accessed by a computer and that can be configured to carry or store expected program code having an instruction or data structure form, without being limited thereto. The memory 602 may exist alone, and the bus 604 is connected to the processor 601. Alternatively, the memory 602 may be integrated with the processor 601. The bus 604 may include a channel for transferring information between the foregoing components.

The transceiver 603 is configured to receive a first message sent by a first terminal;

the memory 602 stores a group of program code, and the processor 601 is configured to call the program code stored in the memory 602 to perform the following operation:

determining a type of the second terminal based on the first message;

the transceiver 603 is further configured to: when the second terminal is a first-type terminal, send first measurement information; or the transceiver 603 is further configured to: when the second terminal is a second-type terminal, receive first measurement information sent by a first-type terminal, determine quality of a first link between the first-type terminal and the second-type terminal based on the received first measurement information, and send the quality of the first link to the first terminal, where the quality of the first link is used to instruct the first terminal to determine a mapping relationship between the first-type terminal and the second-type terminal based on the quality of the first link and send the mapping relationship to terminals corresponding to the mapping relationship; and the transceiver 603 is further configured to receive the mapping relationship, where the mapping relationship is used to: when the second terminal is the first-type terminal, instruct the second terminal to forward data to the second-type terminal corresponding to the mapping relationship.

In a possible implementation, the first measurement information is used to instruct the first terminal to determine quality of a second link between the first terminal and the first-type terminal based on the received first measurement information; and that the quality of the first link is used to instruct the first terminal to determine a mapping relationship between the first-type terminal and the second-type terminal based on the quality of the first link includes:

the quality of the first link is used to instruct the first terminal to determine the mapping relationship between the first-type terminal and the second-type terminal based on the quality of the first link and the quality of the second link.

In a possible implementation, the first message is second measurement information, the first message carries a first threshold, a second threshold, and a third threshold, the first threshold is greater than the second threshold, and the second threshold is greater than the third threshold; and that the processor 601 determines a type of the second terminal based on the first message includes:

determining quality of a third link between the first terminal and the second terminal based on the second measurement information; and when the link quality of the third link is greater than or equal to the second threshold and less than or equal to the first threshold, determining that the second terminal is the first-type terminal; or when the quality of the third link is less than the third threshold, determining that the second terminal is the second-type terminal.

In a possible implementation, the first message is second measurement information;

the transceiver 603 is further configured to receive a second message sent by the first terminal, where the second message includes a first threshold, a second threshold, and a third threshold, the first threshold is greater than the second threshold, and the second threshold is greater than the third threshold; and that the processor 601 determines a type of the second terminal based on the first message includes:

determining quality of a third link between the first terminal and the second terminal based on the second measurement information; and when the quality of the third link is greater than or equal to the second threshold and less than or equal to the first threshold, determining that the second terminal is the first-type terminal; or when the quality of the third link is less than the third threshold, determining that the second terminal is the second-type terminal.

In a possible implementation, the first message includes an identifier and the type of the second terminal; and that the processor 601 determines a type of the second terminal based on the first message includes:

obtaining the identifier of the second terminal, and determining the type of the second terminal based on the obtained identifier.

In a possible implementation, the first message further includes an identifier of a first-type terminal corresponding to each link whose quality needs to be measured by the second-type terminal; and that the transceiver 603 receives first measurement information sent by a first-type terminal, and determines quality of a first link between the first-type terminal and the second-type terminal based on the received first measurement information includes:

receiving first measurement information sent by an expected terminal, and determining quality of a first link between the second terminal and the expected terminal based on the first measurement information, where the expected terminal is any terminal of the first-type terminals corresponding to the links whose quality needs to be measured by the second terminal.

The relay determining apparatus described in FIG. 6 receives the first message sent by the first terminal; determines the type of the second terminal based on the first message; when the second terminal is the first-type terminal, sends the first measurement information; or when the second terminal is the second-type terminal, receives the first measurement information sent by the first-type terminal, determines the quality of the first link between the first-type terminal and the second-type terminal based on the received first measurement information, and sends the quality of the first link to the first terminal, where the quality of the first link is used to instruct the first terminal to determine the mapping relationship between the first-type terminal and the second-type terminal based on the quality of the first link and send the mapping relationship to the terminals corresponding to the mapping relationship; and receives the mapping relationship, where the mapping relationship is used to: when the second terminal is the first-type terminal, instruct the second terminal to forward data to the second-type terminal corresponding to the mapping relationship. The first-type terminal may forward the data to the second-type terminal. Therefore, a distance at which the second-type terminal receives the data may be reduced. This reduces a path loss and increases a signal-to-noise ratio, thereby improving information transmission reliability.

To facilitate better understanding of a resource configuration method and a terminal that are disclosed in the embodiments of the present invention, the following first describes an application scenario used in the embodiments of the present invention. A large quantity of traffic accidents happen around the world every year, causing massive casualties and property damages. A main cause to traffic accidents is a lack of a mechanism between vehicles for exchanging information reliably. An Internet of Vehicles system intends to implement vehicle-to-vehicle (V2V), vehicle-to-infrastructure (V2I), and vehicle-to-pedestrian (V2P) communication, to improve road safety, improve traffic efficiency, and provide rich streaming media services for users.

An intelligent transport system (ITS) has strict requirements on a low delay of communication and on high-reliability communication. A 3rd generation partnership project (3GPP) long term evolution (LTE) technology has advantages such as a short delay, a high speed, large coverage, a large capacity, and high reliability. Therefore, implementing the Internet of Vehicles by using the LTE technology becomes a main trend at present.

LTE V2X (including V2V, V2P, and V2I) communication includes a base station scheduling mode (namely, a mode 3) and a terminal autonomous scheduling mode (namely, a mode 4). In the base station scheduling mode, a vehicle terminal accesses an LTE network, a base station is responsible for allocating a resource to a sidelink (SL) for direct vehicle communication, and the vehicle terminal performs communication by using the resource scheduled by the base station. In the terminal autonomous scheduling mode, a base station configures a resource pool for a terminal by using a system information block (SIB) message or a radio resource control (RRC) message; and when the terminal is a vehicle user equipment (V-UE), a listening-based resource selection manner may be used to select a resource from the resource pool for communication; or when the terminal is a pedestrian user equipment (P-UE), a random resource selection manner or a listening-based resource selection manner may be used, depending on configuration of the P-UE by the base station. Different from a conventional mode in which a base station and a terminal perform communication by using an uplink and a downlink, V2V communication or V2P communication uses a sidelink for communication. However, when current V2X communication operates in the mode 4, cross-carrier scheduling is not supported.

In V2X communication, an entire plane may be divided into several rectangular zones (Zone). In addition, the system configures a corresponding resource pool for each zone. Terminals in two adjacent zones use different resource pools, to reduce mutual interference and a conflict when the terminals select resources. A terminal in a specific zone determines a unique zone ID by using location information of the terminal and zone information received from a base station, and performs communication by using a resource pool corresponding to the zone ID. The zone information includes at least a length and a width of a single zone, a quantity of mod operations of the zone in a horizontal direction, and a quantity of mod operations of the zone in a vertical direction. Therefore, there is a correspondence between the zone information and the resource pool.

Figure 7:
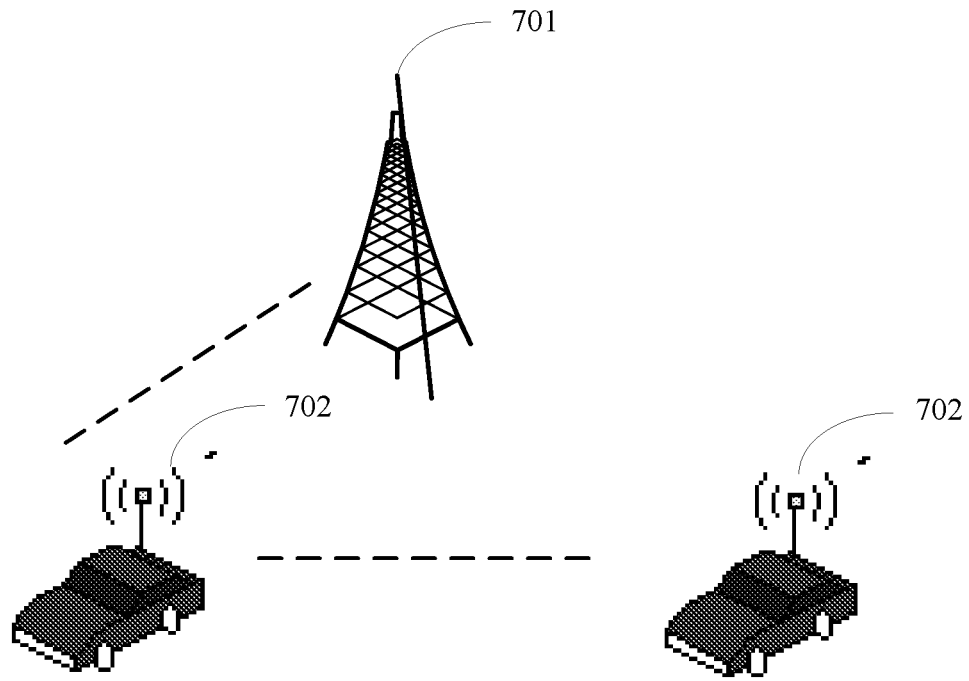
FIG. 7 is a schematic diagram of another network architecture disclosed in an embodiment of the present invention.

To facilitate better understanding of the resource configuration method and the terminal that are disclosed in the embodiments of the present invention, the following first describes a network architecture used in the embodiments of the present invention. FIG. 7 is a schematic diagram of another network architecture disclosed in an embodiment of the present invention. As shown in FIG. 7, the network architecture may include a base station 701 and at least two terminals 702. The base station 701 may communicate with the at least two terminals 702 over a network, and the at least two terminals 702 may also communicate with each other over a network. The communication between the at least two terminals 702 is SL communication. The terminals 702 are vehicle terminals.

Figure 8:
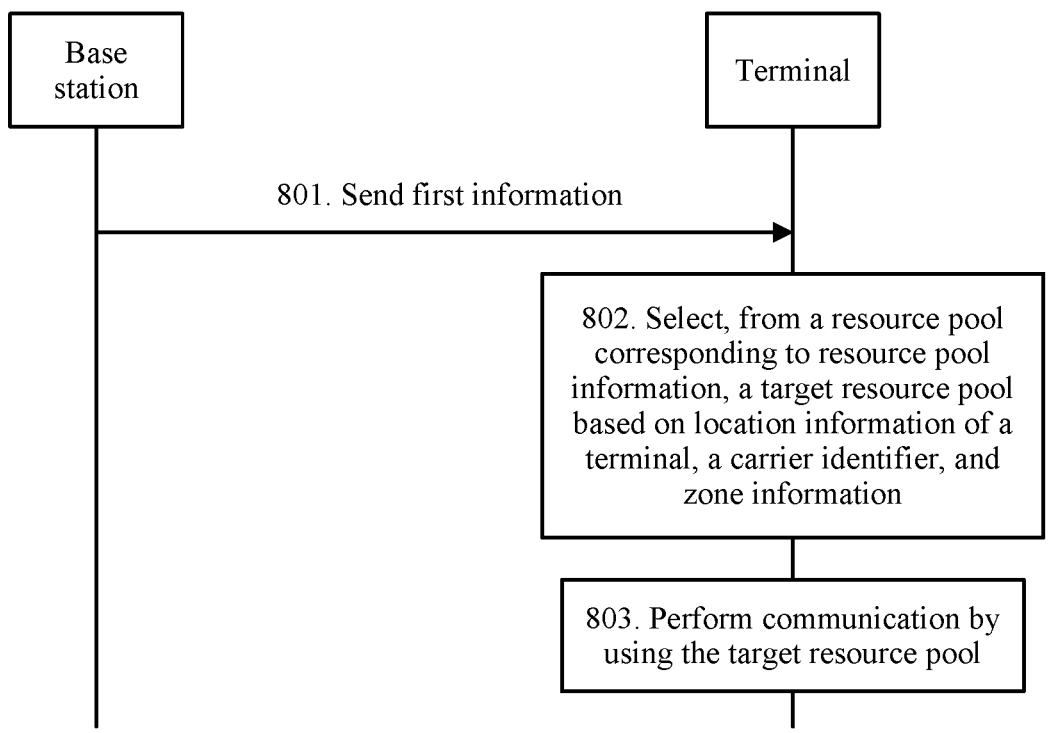
FIG. 8 is a schematic flowchart of a resource configuration method disclosed in an embodiment of the present invention.

Based on the network architecture shown in FIG. 7, FIG. 8 is a schematic flowchart of a resource configuration method disclosed in an embodiment of the present invention. The resource configuration method is described from a perspective of the base station 701 and the terminals 702. As shown in FIG. 8, the resource configuration method may include the following steps.

801. A base station sends, to a terminal, first information that includes a carrier identifier, zone information corresponding to the carrier identifier, and resource pool information corresponding to the zone information.

In this embodiment, the base station may send, to the terminal, the first information that includes the carrier identifier, the zone information corresponding to the carrier identifier, and the resource pool information corresponding to the zone information. The carrier identifier is an identifier of a carrier other than a carrier currently used by the terminal, namely, an identifier of a carrier other than a carrier used when the terminal receives the first message sent by the base station. There may be one or more carrier identifiers, one or more pieces of zone information corresponding to the carrier identifier, and one or more pieces of resource pool information corresponding to the zone information. This embodiment sets no limitation thereto. The first information sent to the terminal by the base station may be sent in an SIB manner or may be sent by using RRC signaling. No limitation is set herein.

In an embodiment, the terminal first sends, to the base station, an information obtaining request that carries the carrier identifier. After receiving the information obtaining request, the base station obtains the zone information corresponding to the carrier identifier and the resource pool information corresponding to the zone information, and sends the carrier identifier, the zone information, and the resource pool information to the terminal.

802. The terminal selects, from a resource pool corresponding to the resource pool information, a target resource pool based on location information of the terminal, the carrier identifier, and the zone information.

In this embodiment, after receiving the first information that is sent by the base station and that includes the carrier identifier, the zone information corresponding to the carrier identifier, and the resource pool information corresponding to the zone information, the terminal selects, from the resource pool corresponding to the resource pool information, the target resource pool based on the location information of the terminal, the carrier identifier, and the zone information.

In this embodiment, the first information may further include a cell identifier corresponding to the carrier identifier. The target resource pool may be selected, from the resource pool corresponding to the resource pool information, based on the location information of the terminal, the carrier identifier, the zone information, and the cell identifier.

In this embodiment, when the carrier corresponding to the carrier identifier and the carrier currently used by the terminal belong to different public land mobile networks (PLMN), the first information may further include a PLMN identifier corresponding to the carrier identifier. The target resource pool may be selected, from the resource pool corresponding to the resource pool information, based on the location information of the terminal, the carrier identifier, the zone information, and the PLMN identifier.

In this embodiment, when the carrier corresponding to the carrier identifier and the carrier currently used by the terminal belong to different PLMNs, the first information may further include a cell identifier corresponding to the carrier identifier and a PLMN identifier corresponding to the carrier identifier. The target resource pool may be selected, from the resource pool corresponding to the resource pool information, based on the location information of the terminal, the carrier identifier, the zone information, the cell identifier, and the PLMN identifier.

803. The terminal performs communication by using the target resource pool.

In this embodiment, after selecting, from the resource pool corresponding to the resource pool information, the target resource pool based on the location information of the terminal, the carrier identifier, and the zone information, the terminal performs communication by using the target resource pool, so that the terminal can perform communication by using a plurality of carriers at the same time, thereby improving a system throughput.

In an embodiment, after selecting, from the resource pool corresponding to the resource pool information, the target resource pool based on the location information of the terminal, the carrier identifier, and the zone information, the terminal may first determine whether the terminal has obtained authorization from a PLMN corresponding to the target resource pool. If the terminal has obtained the authorization from the PLMN corresponding to the target resource pool, the terminal directly uses the target resource pool to perform communication. If the terminal has not obtained the authorization from the PLMN corresponding to the target resource pool, the terminal applies to the PLMN corresponding to the target resource pool for the authorization, and then uses the target resource pool to perform communication after obtaining the authorization through application.

In the resource configuration method described in FIG. 8, the base station sends, to the terminal, the first information that includes the carrier identifier, the zone information corresponding to the carrier identifier, and the resource pool information corresponding to the zone information. The terminal selects, from the resource pool corresponding to the resource pool information, the target resource pool based on the location information of the terminal, the carrier identifier, and the zone information; and performs communication by using the target resource pool. In this way, the terminal can perform communication by using a plurality of carriers at the same time, thereby improving the system throughput.

Figure 9:
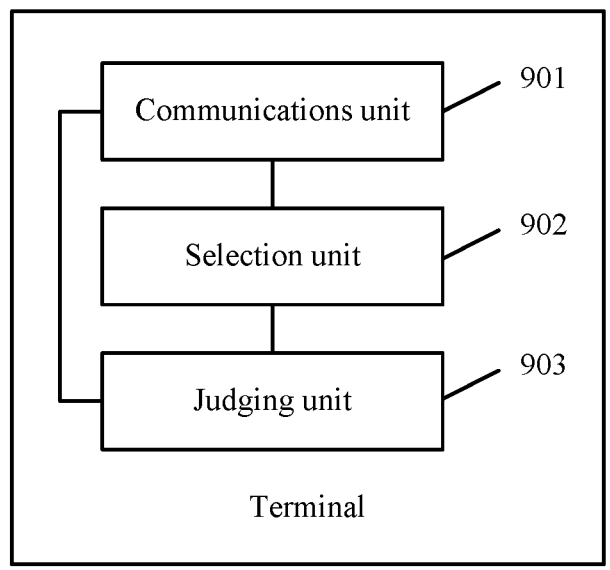
FIG. 9 is a schematic structural diagram of a terminal disclosed in an embodiment of the present invention.

FIG. 9 is a schematic structural diagram of a terminal disclosed in an embodiment of the present invention. As shown in FIG. 9, the terminal may include:

a communications unit 901, configured to receive first information sent by a base station, where the first information may include a carrier identifier, zone information corresponding to the carrier identifier, and resource pool information corresponding to the zone information, and the carrier identifier is an identifier of a carrier other than a carrier currently used by the terminal; and a selection unit 902, configured to select, from a resource pool corresponding to the resource pool information received by the communications unit 901, a target resource pool based on location information of the terminal, the carrier identifier received by the communications unit 901, and the zone information received by the communications unit 901, where the communications unit 901 is further configured to perform communication by using the target resource pool selected by the selection unit 902.

In a possible implementation, the first information may further include a cell identifier corresponding to the carrier identifier; and the selection unit 902 is specifically configured to select, from the resource pool corresponding to the resource pool information, the target resource pool based on the location information of the terminal, the carrier identifier, the zone information, and the cell identifier.

In a possible implementation, when the carrier corresponding to the carrier identifier and the carrier currently used by the terminal belong to different PLMNs, the first information may further include a PLMN identifier corresponding to the carrier identifier; and the selection unit 902 is specifically configured to select, from the resource pool corresponding to the resource pool information, the target resource pool based on the location information of the terminal, the carrier identifier, the zone information, and the PLMN identifier.

In a possible implementation, when the carrier corresponding to the carrier identifier and the carrier currently used by the terminal belong to different PLMNs, the first information may further include a cell identifier corresponding to the carrier identifier and a PLMN identifier corresponding to the carrier identifier; and the selection unit 902 is specifically configured to select, from the resource pool corresponding to the resource pool information, the target resource pool based on the location information of the terminal, the carrier identifier, the zone information, the cell identifier, and the PLMN identifier.

In a possible implementation, the terminal may further include:

a judging unit 903, configured to determine whether authorization from a PLMN corresponding to the target resource pool selected by the selection unit 902 has been obtained, and if the authorization from the PLMN corresponding to the target resource pool has been obtained, trigger the communications unit 901 to perform the step of performing communication by using the target resource pool.

In a possible implementation, the communications unit 901 is further configured to send, to the base station, an information obtaining request that carries the carrier identifier, where the information obtaining request is used to instruct the base station to: obtain the zone information corresponding to the carrier identifier and the resource pool information corresponding to the zone information, and send the carrier identifier, the zone information, and the resource pool information to the terminal.

The terminal described in FIG. 9 receives the first information that is sent by the base station and that includes the carrier identifier, the zone information corresponding to the carrier identifier, and the resource pool information corresponding to the zone information; selects, from the resource pool corresponding to the resource pool information, the target resource pool based on the location information of the terminal, the carrier identifier, and the zone information; and performs communication by using the target resource pool. In this way, the terminal can perform communication by using a plurality of carriers at the same time, thereby improving a system throughput.

Figure 10:
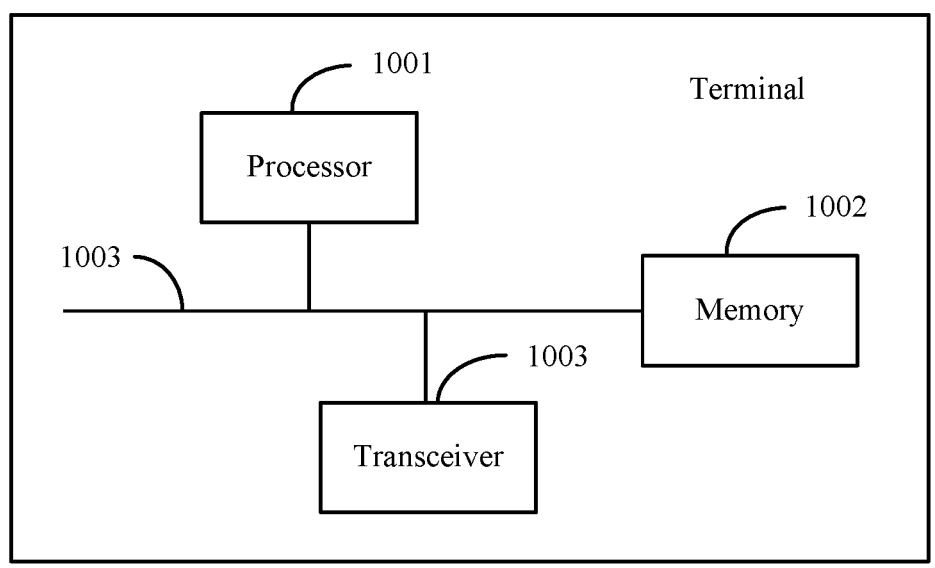
FIG. 10 is a schematic structural diagram of another terminal disclosed in an embodiment of the present invention.

Based on the network architecture shown in FIG. 7, FIG. 10 is a schematic structural diagram of another terminal disclosed in an embodiment of the present invention. As shown in FIG. 10, the terminal may include a processor 1001, a memory 1002, a transceiver 1003, and a bus 1004. The processor 1001 may be a general-purpose central processing unit (CPU), a plurality of CPUs, a microprocessor, an application-specific integrated circuit (ASIC), or one or more integrated circuits that are configured to control program execution of solutions of the present invention. The memory 1002 may be a read-only memory (ROM) or another type of static storage device that can store static information and instructions, or a random access memory (RAM) or another type of dynamic storage device that can store information and instructions; or may be an electrically erasable programmable read-only memory (EEPROM), a compact disc read-only memory (CD-ROM) or other optic disk storage, optical disc storage (including a compact optical disc, a laser disc, an optical disc, a digital general-purpose optical disc, a Blu-ray optical disc, or the like), or magnetic disk storage media or other magnetic storage devices, or any other media that can be accessed by a computer and that can be configured to carry or store expected program code having an instruction or data structure form, without being limited thereto. The memory 1002 may exist alone, and the bus 1004 is connected to the processor 1001. Alternatively, the memory 1002 may be integrated with the processor 1001. The bus 1004 may include a channel for transferring information between the foregoing components.

The transceiver 1003 is configured to receive first information sent by a base station and send the first information to the processor 1001, where the first information may include a carrier identifier, zone information corresponding to the carrier identifier, and resource pool information corresponding to the zone information, and the carrier identifier is an identifier of a carrier other than a carrier currently used by the terminal;

the memory 1002 stores a group of program code, and the processor 1001 is configured to call the program code stored in the memory 1002 to perform the following operation:

selecting, from a resource pool corresponding to the resource pool information, a target resource pool based on location information of the terminal, the carrier identifier, and the zone information; and the transceiver 1003 is further configured to perform communication by using the target resource pool.

In a possible implementation, the first information may further include a cell identifier corresponding to the carrier identifier; and that the processor 1001 selects, from a resource pool corresponding to the resource pool information, a target resource pool based on location information of the terminal, the carrier identifier, and the zone information includes:

selecting, from the resource pool corresponding to the resource pool information, the target resource pool based on the location information of the terminal, the carrier identifier, the zone information, and the cell identifier.

In a possible implementation, when the carrier corresponding to the carrier identifier and the carrier currently used by the terminal belong to different PLMNs, the first information may further include a PLMN identifier corresponding to the carrier identifier; and that the processor 1001 selects, from a resource pool corresponding to the resource pool information, a target resource pool based on location information of the terminal, the carrier identifier, and the zone information includes:

selecting, from the resource pool corresponding to the resource pool information, the target resource pool based on the location information of the terminal, the carrier identifier, the zone information, and the PLMN identifier.

In a possible implementation, when the carrier corresponding to the carrier identifier and the carrier currently used by the terminal belong to different PLMNs, the first information may further include a cell identifier corresponding to the carrier identifier and a PLMN identifier corresponding to the carrier identifier; and that the processor 1001 selects, from a resource pool corresponding to the resource pool information, a target resource pool based on location information of the terminal, the carrier identifier, and the zone information includes:

selecting, from the resource pool corresponding to the resource pool information, the target resource pool based on the location information of the terminal, the carrier identifier, the zone information, the cell identifier, and the PLMN identifier.

In a possible implementation, the processor 1001 is further configured to call the program code stored in the memory 1002 to perform the following operation:

determining whether authorization from a PLMN corresponding to the target resource pool has been obtained; and if the authorization from the PLMN corresponding to the target resource pool has been obtained, the transceiver 1003 performs the step of performing communication by using the target resource pool.

In a possible implementation, before the transceiver 1003 receives the first information sent by the base station, the transceiver 1003 is further configured to send, to the base station, an information obtaining request that carries the carrier identifier, where the information obtaining request is used to instruct the base station to: obtain the zone information corresponding to the carrier identifier and the resource pool information corresponding to the zone information, and send the carrier identifier, the zone information, and the resource pool information to the terminal.

The terminal described in FIG. 10 receives the first information that is sent by the base station and that includes the carrier identifier, the zone information corresponding to the carrier identifier, and the resource pool information corresponding to the zone information; selects, from the resource pool corresponding to the resource pool information, the target resource pool based on the location information of the terminal, the carrier identifier, and the zone information; and performs communication by using the target resource pool. In this way, the terminal can perform communication by using a plurality of carriers at the same time, thereby improving a system throughput.

Figure 11:
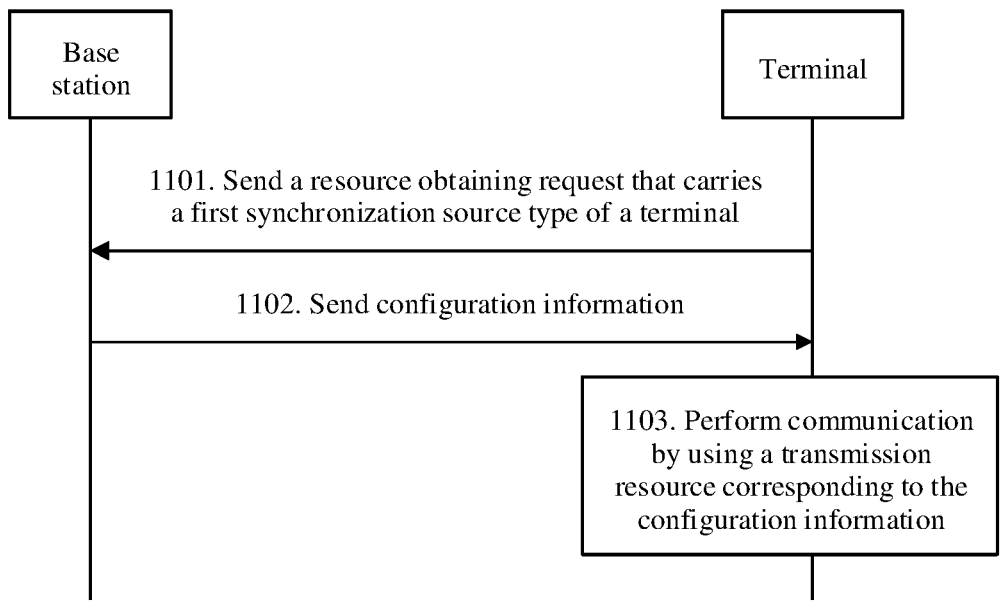
FIG. 11 is a schematic flowchart of an information obtaining method disclosed in an embodiment of the present invention.

FIG. 11 is a schematic flowchart of an information obtaining method disclosed in an embodiment of the present invention. The information obtaining method is described from a perspective of a base station and a terminal. As shown in FIG. 11, the information obtaining method may include the following steps.

1101. The terminal sends, to the base station, a resource obtaining request that carries a first synchronization source type of the terminal.

In this embodiment, when the terminal needs to perform communication, the terminal may send, to the base station, the resource obtaining request that carries the first synchronization source type of the terminal. A synchronization source type is a type of a time synchronization source, and may include a global navigation satellite system (GNSS), another terminal that is directly synchronous with the GNSS, another terminal that is indirectly synchronous with the GNSS, an evolved NodeB (eNB or eNodeB), another terminal that is directly synchronous with the eNB, and another terminal that is indirectly synchronous with the eNB. When the GNSS is used as a synchronization source, the terminal directly receives a GNSS signal, and uses a GNSS clock as the synchronization source. When the another terminal that is directly synchronous with the GNSS is used as a synchronization source, the terminal is synchronous with the another terminal, and the another terminal uses a GNSS clock as the synchronization source. When the another terminal that is indirectly synchronous with the GNSS is used as a synchronization source, a GNSS clock obtained by the terminal is from a particular terminal, excluding the case in which the terminal that is directly synchronous with the GNSS is used as a synchronization source. When the eNB is used as a synchronization source, the terminal uses a time of the eNB as the synchronization source, to be specific, uses a time of a primary cell (PCell) or a time of a serving cell as a synchronization time. The terminal that is directly synchronous with the eNB is similar to the case of the another terminal that is directly synchronous with the GNSS, except that a clock of the terminal is the eNB. The terminal that is indirectly synchronous with the eNB is similar to the case of the other terminal that is indirectly synchronous with the GNSS, except that a clock of the terminal is the eNB.

In an embodiment, when the terminal is in an idle mode (idle), the terminal receives an SIB that is sent by the base station and that includes configuration information of a resource pool and a second synchronization source type corresponding to the resource pool. When the second synchronization source type is different from the first synchronization source type of the terminal, the terminal sends a connection request to the base station, so that the base station establishes a connection between the base station and the terminal. In other words, the terminal switches from the idle mode to a connected mode. Then, the terminal sends, to the base station, the resource obtaining request that carries the first synchronization source type of the terminal.

1102. The base station allocates a transmission resource to the terminal based on the first synchronization source type, and sends configuration information of the transmission resource to the terminal.

In this embodiment, after receiving the resource obtaining request that is sent by the terminal and that carries the first synchronization source type of the terminal, the base station allocates the transmission resource to the terminal based on the first synchronization source type, and sends the configuration information of the transmission resource to the terminal. The transmission resource may include a resource dynamically scheduled for the terminal by the base station in a resource pool or base station scheduling mode.

1103. The terminal performs communication by using the transmission resource corresponding to the configuration information.

In this embodiment, after receiving the configuration information of the transmission resource sent by the base station, the terminal performs communication by using the transmission resource corresponding to the configuration information.

In the information obtaining method described in FIG. 11, the terminal sends, to the base station, resource request information that carries the first synchronization source type of the terminal; the base station allocates the transmission resource to the terminal based on the first synchronization source type, and sends the configuration information of the transmission resource to the terminal; and the terminal performs communication by using the transmission resource corresponding to the configuration information, so that the terminal can perform communication by using the resource corresponding to the synchronization source type of the terminal.

Figure 12:
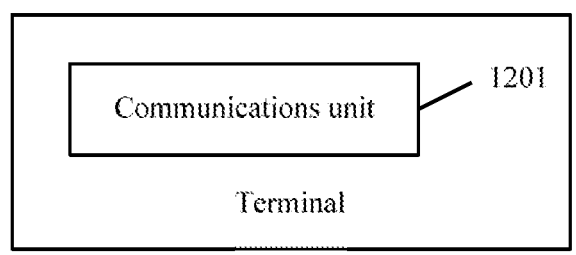
FIG. 12 is a schematic structural diagram of still another terminal disclosed in an embodiment of the present invention.

FIG. 12 is a schematic structural diagram of still another terminal disclosed in an embodiment of the present invention. The terminal may include:

a communications unit 1201, configured to send a resource obtaining request to a base station, where the resource obtaining request carries a first synchronization source type of the terminal, and the resource obtaining request is used to instruct the base station to: allocate a transmission resource to the terminal based on the first synchronization source type, and send configuration information of the transmission resource to the terminal, where the communications unit 1201 is further configured to receive the configuration information sent by the base station; and the communications unit 1201 is further configured to perform communication by using the transmission resource corresponding to the configuration information.

In a possible implementation, the transmission resource may include a resource scheduled for the terminal by the base station in a resource pool or base station scheduling mode.

In a possible implementation, the communications unit 1201 is further configured to: when the terminal is in an idle mode, receive an SIB sent by the base station, where the SIB includes configuration information of a resource pool and a second synchronization source type corresponding to the resource pool; and the communications unit 1201 is further configured to: when the second synchronization source type is different from the first synchronization source type, send a connection request to the base station, where the connection request is used to instruct the base station to establish a connection between the base station and the terminal.

The terminal described in FIG. 12 sends the resource obtaining request to the base station, receives the configuration information sent by the base station, and performs communication by using the transmission resource corresponding to the configuration information, so that the terminal can perform communication by using the resource corresponding to the synchronization source type of the terminal.

Figure 13:
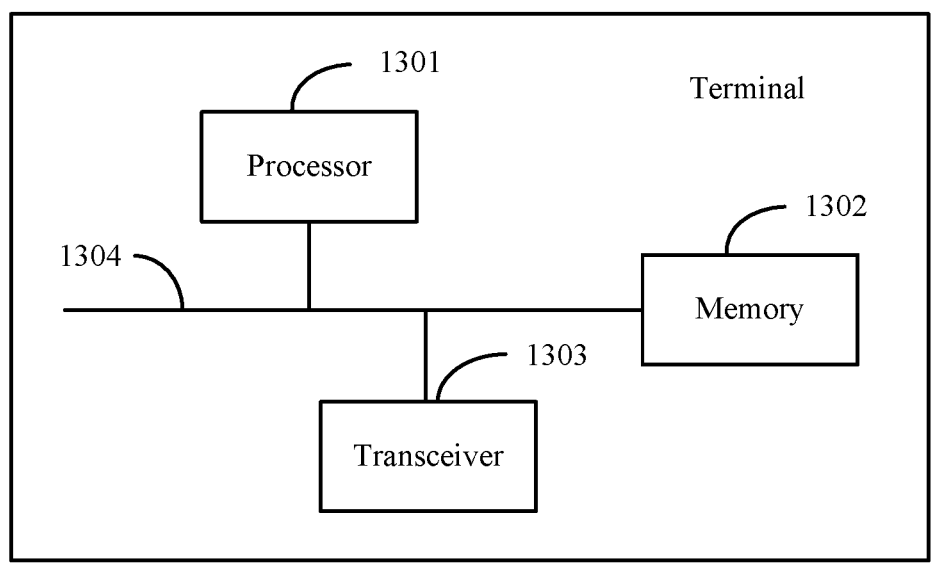
FIG. 13 is a schematic structural diagram of yet another terminal disclosed in an embodiment of the present invention.

FIG. 13 is a schematic structural diagram of yet another terminal disclosed in an embodiment of the present invention. As shown in FIG. 13, the terminal may include a processor 1301, a memory 1302, a transceiver 1303, and a bus 1304. The processor 1301 may be a general-purpose central processing unit (CPU), a plurality of CPUs, a microprocessor, an application-specific integrated circuit (ASIC), or one or more integrated circuits that are configured to control program execution of solutions of the present invention. The memory 1302 may be a read-only memory (ROM) or another type of static storage device that can store static information and instructions, or a random access memory (RAM) or another type of dynamic storage device that can store information and instructions; or may be an electrically erasable programmable read-only memory (EEPROM), a compact disc read-only memory (CD-ROM) or other optic disk storage, optical disc storage (including a compact optical disc, a laser disc, an optical disc, a digital general-purpose optical disc, a Blu-ray optical disc, or the like), or magnetic disk storage media or other magnetic storage devices, or any other media that can be accessed by a computer and that can be configured to carry or store expected program code having an instruction or data structure form, without being limited thereto. The memory 1302 may exist alone, and the bus 1304 is connected to the processor 1301. Alternatively, the memory 1302 may be integrated with the processor 1301. The bus 1304 may include a channel for transferring information between the foregoing components.

The memory 1302 stores a group of program code, and the processor 1301 is configured to call the program code stored in the memory 1302 to control the transceiver 1303 to perform the following operations:

sending a resource obtaining request to a base station, where the resource obtaining request carries a first synchronization source type of the terminal, and the resource obtaining request is used to instruct the base station to: allocate a transmission resource to the terminal based on the first synchronization source type, and send configuration information of the transmission resource to the terminal;

receiving the configuration information sent by the base station; and performing communication by using the transmission resource corresponding to the configuration information.

In a possible implementation, the transmission resource may include a resource scheduled for the terminal by the base station in a resource pool or base station scheduling mode.

In a possible implementation, before the transceiver 1303 sends the resource obtaining request to the base station, the transceiver 1303 is further configured to:

when the terminal is in an idle mode, receive an SIB sent by the base station, where the SIB includes configuration information of a resource pool and a second synchronization source type corresponding to the resource pool; and when the second synchronization source type is different from the first synchronization source type, send a connection request to the base station, where the connection request is used to instruct the base station to establish a connection between the base station and the terminal.

The terminal described in FIG. 13 sends the resource obtaining request to the base station, receives the configuration information sent by the base station, and performs communication by using the transmission resource corresponding to the configuration information, so that the terminal can perform communication by using the resource corresponding to the synchronization source type of the terminal.

An embodiment of the present invention further discloses a readable storage medium, where the readable storage medium stores program code used by a terminal to perform the relay determining method shown in FIG. 2.

An embodiment of the present invention further discloses a readable storage medium, where the readable storage medium stores program code used by a terminal to perform the resource configuration method shown in FIG. 8.

An embodiment of the present invention further discloses a readable storage medium, where the readable storage medium stores program code used by a terminal to perform the information obtaining method shown in FIG. 11.

A person of ordinary skill in the art may understand that all or some of the processes of the methods in the embodiments may be implemented by a computer program instructing related hardware. The program may be stored in a computer readable storage medium. When the program runs, the processes of the embodiments of the foregoing methods may be included. The storage medium may be a magnetic disc, an optical disc, a read-only memory (ROM), a random access memory (RAM), or the like.

What is claimed is:

1. A relay determining method carried out in a first terminal, and comprises the method comprising:
    sending a first message to a second terminal, wherein the first message instructs the second terminal to determine a terminal type of the second terminal based on the first message; and wherein based on the first message, the second terminal operating as a second-type terminal:
        receives a first measurement information sent by a third terminal operating as a first-type terminal, wherein the third terminal is any terminal except the first terminal, and wherein the first measurement information relates to a second link between the first terminal and the third terminal,
        determines, based on the received first measurement information, a quality of a first link between the third terminal operating as the first-type terminal and the second terminal operating as the second-type terminal, and
        sends the quality of the first link to the first terminal;
    receiving the quality of the first link sent by the second-type terminal;
    determining, based on the quality of the first link, a mapping relationship between the third terminal operating as the first-type terminal and the second terminal operating as the second-type terminal; and
    providing the mapping relationship to at least the third terminal operating as the first-type terminal, wherein the mapping relationship instructs the third terminal, operating as the first-type terminal of the mapping relationship, to forward a received data to the second terminal operating as the second-type terminal of the mapping relationship,
    wherein:
        the first message includes a second measurement information,
        the first message carries a first threshold, a second threshold, and a third threshold;
        the first threshold is greater than the second threshold, and
        the second threshold is greater than the third threshold; and
    wherein the second terminal determines a terminal type of the second terminal by:
        determining a quality of a third link between the first terminal and the second terminal based on the second measurement information; and determining the second terminal is the second-type terminal in the case where the quality of the third link is less than the third threshold.

2. The method according to claim 1, wherein the method further comprises:
determining, a quality of a second link between the first terminal and the third terminal based on the first measurement information,
wherein the determining a mapping relationship comprises:
determining the mapping relationship based on the quality of the first link and the quality of the second link.

3. The method according to claim 1, wherein the first message comprises an identifier of the second terminal and the type of the second terminal; and
that the first message is used to instruct the second terminal to determine a type of the second terminal based on the first message comprises:
the first message is used to instruct the second terminal to determine the type of the second terminal based on the identifier of the second terminal.

4. A relay determining method carried out in a first terminal, and comprises the method comprising:
sending a first message to a second terminal, wherein the first message instructs the second terminal to determine a terminal type of the second terminal based on the first message; and wherein based on the first message, the second terminal operating as a second-type terminal:
receives a first measurement information sent by a third terminal operating as a first-type terminal, wherein the third terminal is any terminal except the first terminal, and wherein the first measurement information relates to a second link between the first terminal and the third terminal,
determines, based on the received first measurement information, a quality of a first link between the third terminal operating as the first-type terminal and the second terminal operating as the second-type terminal, and
sends the quality of the first link to the first terminal;
receiving the quality of the first link sent by the second-type terminal;
determining, based on the quality of the first link, a mapping relationship between the third terminal operating as the first-type terminal and the second terminal operating as the second-type terminal; and
providing the mapping relationship to at least the third terminal operating as the first-type terminal, wherein the mapping relationship instructs the third terminal, operating as the first-type terminal of the mapping relationship, to forward a received data to the second terminal operating as the second-type terminal of the mapping relationship,
wherein:
the first message includes a second measurement information,
the method further comprises sending a second message to the second terminal,
the second message comprises a first threshold, a second threshold, and a third threshold;
the first threshold is greater than the second threshold, and
the second threshold is greater than the third threshold; and
wherein the second terminal determines a terminal type of the second terminal by:
determining a quality of a third link between the first terminal and the second terminal based on the second measurement information; and
determining the second terminal is the second-type terminal in the case where the quality of the third link is less than the third threshold.

5. A relay determining method, wherein the method is applied to a second terminal, and comprises:
receiving a first message, sent by a first terminal, wherein the first message instructs the second terminal to determine a terminal type of the second terminal based on the first message; and
determining, based on the first message, that the second terminal is a second-type terminal and wherein, in accordance with determining the second terminal is a second-type terminal, the second terminal:
receives a first measurement information sent by a third terminal operating as a first-type terminal, wherein the third terminal is any terminal except the first terminal, and wherein the first measurement information relates to a second link between the first terminal and the third terminal,
determines, based on the received first measurement information, a quality of a first link between the third terminal operating as the first-type terminal and the second terminal operating as the second-type terminal, and
sends the quality of the first link to the first terminal, wherein the quality of the first link instructs the first terminal to:
determine, based on the quality of the first link, a mapping relationship between the third terminal operating as the first-type terminal and the second terminal operating as the second-type terminal, and
provide the mapping relationship to at least the third terminal operating as the first-type terminal, wherein the mapping relationship instructs the third terminal, operating as the first-type terminal of the mapping relationship, to forward a received data to the second terminal operating as the second-type terminal of the mapping relationship,
wherein:
the first message includes a second measurement information,
the first message carries a first threshold, a second threshold, and a third threshold;
the first threshold is greater than the second threshold, and
the second threshold is greater than the third threshold; and
wherein the determining a type of the second terminal based on the first message comprises:
determining a quality of a third link between the first terminal and the second terminal based on the second measurement information; and
determining the second terminal is the second-type terminal in the case where the quality of the third link is less than the third threshold.

6. The method according to claim 5, wherein the first measurement information instructs the first terminal to determine a quality of a second link between the first terminal and the third terminal based on the first measurement information,
that the quality of the first link is used to determine a mapping relationship between the first-type terminal and the second-type terminal comprises:

determining the mapping relationship between the first-type terminal and the second-type terminal based on the quality of the first link and the quality of the second link.

7. The method according to claim 5, wherein the first message comprises an identifier of the second terminal and the type of the second terminal; and
the determining a type of the second terminal based on the first message comprises:
obtaining the identifier of the second terminal, and determining the type of the second terminal based on the obtained identifier.

8. A relay determining method, wherein the method is applied to a second terminal, and comprises:
receiving a first message, sent by a first terminal, wherein the first message instructs the second terminal to determine a terminal type of the second terminal based on the first message; and
determining, based on the first message, that the second terminal is a second-type terminal and wherein, in accordance with determining the second terminal is a second-type terminal, the second terminal:
receives a first measurement information sent by a third terminal operating as a first-type terminal, wherein the third terminal is any terminal except the first terminal, and wherein the first measurement information relates to a second link between the first terminal and the third terminal,
determines, based on the received first measurement information, a quality of a first link between the third terminal operating as the first-type terminal and the second terminal operating as the second-type terminal, and
sends the quality of the first link to the first terminal, wherein the quality of the first link instructs the first terminal to:
determine, based on the quality of the first link, a mapping relationship between the third terminal operating as the first-type terminal and the second terminal operating as the second-type terminal, and
provide the mapping relationship to at least the third terminal operating as the first-type terminal, wherein the mapping relationship instructs the third terminal, operating as the first-type terminal of the mapping relationship, to forward a received data to the second terminal operating as the second-type terminal of the mapping relationship,
wherein:
the first message includes a second measurement information;
the method further comprises receiving a second message sent by the first terminal,
the second message comprises a first threshold, a second threshold, and a third threshold;
the first threshold is greater than the second threshold, and
the second threshold is greater than the third threshold; and
wherein the second terminal determines a terminal type of the second terminal by:
determining a quality of a third link between the first terminal and the second terminal based on the second measurement information; and
determining the second terminal is the second-type terminal in the case where the quality of the third link is less than the third threshold.

9. A relay determining apparatus, wherein the apparatus is applied to a first terminal, and comprises a transmitter, a receiver, and a processor;
wherein the transmitter is configured to cooperatively operate with the processor to send a first message to a second terminal, wherein the first message instructs the second terminal to determine a terminal type of the second terminal based on the first message; and
wherein based on the first message, the second terminal operating as a second-type terminal:
receives a first measurement information sent by a third terminal operating as a first-type terminal, wherein the third terminal is any terminal except the first terminal, and wherein the first measurement information relates to a second link between the first terminal and the third terminal,
determines, based on the received first measurement information, a quality of a first link between the third terminal operating as the first-type terminal and the second terminal operating as the second-type terminal, and
sends the quality of the first link to the first terminal;
wherein the receiver is configured to cooperatively operate with the processor to receive the quality of the first link sent by the second-type terminal,
wherein the processor is configured to determine, based on the quality of the first link, a mapping relationship between the third terminal operating as the first-type terminal and the second terminal operating as the second-type terminal,
wherein the transmitter is further configured to cooperatively operate with the processor to provide the mapping relationship to at least the third terminal operating as the first-type terminal, wherein the mapping relationship instructs the third terminal, operating as the first-type terminal of the mapping relationship, to forward a received data to the second terminal operating as the second-type terminal of the mapping relationship,
wherein:
the first message includes a second measurement information,
the first message carries a first threshold, a second threshold, and a third threshold;
the first threshold is greater than the second threshold, and
the second threshold is greater than the third threshold; and
wherein the second terminal determines a terminal type of the second terminal by:
determining a quality of a third link between the first terminal and the second terminal based on the second measurement information; and
determining the second terminal is the second-type terminal in the case where the quality of the third link is less than the third threshold.

10. The apparatus according to claim 9,
the processor is further configured to:
determine a quality of a second link between the first terminal and the third terminal based on the first measurement information; and
wherein the determining a mapping relationship comprises:
determining the mapping relationship based on the quality of the first link and the quality of the second link.

11. The apparatus according to claim 9, wherein the first message comprises an identifier of the second terminal and the type of the second terminal; and that the first message is used to instruct the second terminal to determine a type of the second terminal based on the first message comprises:

the first message is used to instruct the second terminal to determine the type of the second terminal based on the identifier of the second terminal.

12. A relay determining apparatus, wherein the apparatus is applied to a first terminal, and comprises a transmitter, a receiver, and a processor;

wherein the transmitter is configured to cooperatively operate with the processor to send a first message to a second terminal, wherein the first message instructs the second terminal to determine a terminal type of the second terminal based on the first message; and wherein based on the first message, the second terminal operating as a second-type terminal:

receives a first measurement information sent by a third terminal operating as a first-type terminal, wherein the third terminal is any terminal except the first terminal, and wherein the first measurement information relates to a second link between the first terminal and the third terminal, determines, based on the received first measurement information, a quality of a first link between the third terminal operating as the first-type terminal and the second terminal operating as the second-type terminal, and sends the quality of the first link to the first terminal;

wherein the receiver is configured to cooperatively operate with the processor to receive the quality of the first link sent by the second-type terminal, wherein the processor is configured to determine, based on the quality of the first link, a mapping relationship between the third terminal operating as the first-type terminal and the second terminal operating as the second-type terminal, wherein the transmitter is further configured to cooperatively operate with the processor to provide the mapping relationship to at least the third terminal operating as the first-type terminal, wherein the mapping relationship instructs the third terminal, operating as the first-type terminal of the mapping relationship, to forward a received data to the second terminal operating as the second-type terminal of the mapping relationship, wherein:

the first message includes a second measurement information;

the transmitter is further configured to cooperatively operate with the processor to send a second message to the second terminal, the second message comprises a first threshold, a second threshold, and a third threshold;

the first threshold is greater than the second threshold, and the second threshold is greater than the third threshold; and wherein the second terminal determines a terminal type of the second terminal by:

determining a quality of a third link between the first terminal and the second terminal based on the second measurement information; and determining the second terminal is the second-type terminal in the case where the quality of the third link is less than the third threshold.

13. A relay determining apparatus, wherein the apparatus is applied to a second terminal, and comprises a transmitter, a receiver, and a processor:

wherein the receiver is configured to cooperatively operate with the processor to receive a first message sent by a first terminal, wherein the first message instructs the second terminal to determine a terminal type of the second terminal based on the first message, wherein the processor is configured to determine, based on the first message, that the second terminal is a second-type terminal and wherein, in accordance with determining the second terminal is a second-type terminal, the second terminal:

receives, by the receiver cooperatively operating with the processor, a first measurement information sent by a third terminal operating as a first-type terminal, wherein the third terminal is any terminal except the first terminal, and wherein the measurement information relates to a second link between the first terminal and the third terminal, determines, by the processor using the received first measurement information, a quality of a first link between the third terminal operating as the first-type terminal and the second terminal operating as the second-type terminal, and sends, by the transmitter cooperatively operating with the processor, the quality of the first link to the first terminal, wherein the quality of the first link instructs the first terminal to:

determine, based on the quality of the first link, a mapping relationship between the third terminal operating as the first-type terminal and the second terminal operating as the second-type terminal, and provide the mapping relationship to at least the third terminal operating as the first-type terminal, wherein the mapping relationship instructs the third terminal, operating as the first-type terminal of the mapping relationship, to forward a received data to the second terminal operating as the second-type terminal of the mapping relationship, wherein:

the first message includes a second measurement information, the first message carries a first threshold, a second threshold, and a third threshold;

the first threshold is greater than the second threshold, and the second threshold is greater than the third threshold; and wherein the processor is configured to:

determine a quality of a third link between the first terminal and the second terminal based on the second measurement information; and determine the second terminal is the second-type terminal in the case where the quality of the third link is less than the third threshold.

14. The apparatus according to claim 13, wherein the first measurement information instructs the first terminal to determine a quality of a second link between the first terminal and the third terminal based on the first measurement information, that the quality of the first link is used to determine a mapping relationship between the first-type terminal and the second-type terminal comprises:
determining the mapping relationship between the first-type terminal and the second-type terminal based on the quality of the first link and the quality of the second link.

15. The apparatus according to claim 13, wherein the first message comprises an identifier of the second terminal and the type of the second terminal; and
the processor is configured to obtain the identifier of the second terminal, and determine the type of the second terminal based on the obtained identifier.

16. A relay determining apparatus, wherein the apparatus is applied to a second terminal, and comprises a transmitter, a receiver, and a processor:
wherein the receiver is configured to cooperatively operate with the processor to receive a first message sent by a first terminal, wherein the first message instructs the second terminal to determine a terminal type of the second terminal based on the first message,
wherein the processor is configured to determine, based on the first message, that the second terminal is a second-type terminal and wherein, in accordance with determining the second terminal is a second-type terminal, the second terminal:
receives, by the receiver cooperatively operating with the processor, a first measurement information sent by a third terminal operating as a first-type terminal, wherein the third terminal is any terminal except the first terminal, and wherein the measurement information relates to a second link between the first terminal and the third terminal,
determines, by the processor using the received first measurement information, a quality of a first link between the third terminal operating as the first-type terminal and the second terminal operating as the second-type terminal, and
sends, by the transmitter cooperatively operating with the processor, the quality of the first link to the first terminal, wherein the quality of the first link instructs the first terminal to:
determine, based on the quality of the first link, a mapping relationship between the third terminal operating as the first-type terminal and the second terminal operating as the second-type terminal, and
provide the mapping relationship to at least the third terminal operating as the first-type terminal, wherein the mapping relationship instructs the third terminal, operating as the first-type terminal of the mapping relationship, to forward a received data to the second terminal operating as the second-type terminal of the mapping relationship,
wherein:
the first message includes a second measurement information;
the receiver is further configured to cooperatively operate with the processor to receive a second message sent by the first terminal,
the second message comprises a first threshold, a second threshold, and a third threshold;
the first threshold is greater than the second threshold, and
the second threshold is greater than the third threshold; and
wherein the processor is configured to:
determine a quality of a third link between the first terminal and the second terminal based on the second measurement information; and
determine the second terminal is the second-type terminal in the case where the quality of the third link is less than the third threshold.

* * * * *